United States Patent
Censo et al.

(10) Patent No.: US 9,354,073 B2
(45) Date of Patent: May 31, 2016

(54) EYE GAZE ENABLED NAVIGATION SYSTEM

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 0 days.

(21) Appl. No.: 14/100,386

(22) Filed: Dec. 9, 2013

(65) Prior Publication Data

US 2015/0160033 A1  Jun. 11, 2015

(51) Int. Cl.
    *G01C 21/36* (2006.01)
(52) U.S. Cl.
    CPC .................... *G01C 21/3626* (2013.01)
(58) Field of Classification Search
    CPC ........... G01S 13/93; G01S 13/931; G01S 2013/9357; G01S 2013/9371; G08G 1/16; G08G 1/167; G08G 1/0968; G08G 1/096844; B60W 30/08; G01C 21/26; G01C 21/3644
    USPC .......................................... 701/300, 301, 400
    See application file for complete search history.

(56) References Cited

U.S. PATENT DOCUMENTS

| | | | |
|---|---|---|---|
| 6,989,754 B2 | 1/2006 | Kisacanin et al. | |
| 8,688,377 B1 * | 4/2014 | Urbach et al. | 701/522 |
| 2006/0095204 A1 * | 5/2006 | Kim | 701/211 |
| 2007/0067100 A1 * | 3/2007 | Matsumoto | 701/208 |
| 2010/0113149 A1 * | 5/2010 | Suddreth et al. | 463/31 |
| 2010/0165093 A1 * | 7/2010 | Sugio et al. | 348/78 |
| 2011/0098911 A1 * | 4/2011 | Ellanti | 701/200 |
| 2012/0053826 A1 * | 3/2012 | Slamka | 701/301 |
| 2012/0062357 A1 * | 3/2012 | Slamka | 340/4.11 |
| 2012/0242698 A1 * | 9/2012 | Haddick et al. | 345/633 |
| 2012/0271484 A1 * | 10/2012 | Feit et al. | 701/1 |
| 2013/0030811 A1 * | 1/2013 | Olleon et al. | 704/267 |

(Continued)

FOREIGN PATENT DOCUMENTS

JP        2001357498 A  *  12/2001

OTHER PUBLICATIONS

International Search Report dated Feb. 26, 2015 in Application No. PCT/US14/69119.

(Continued)

*Primary Examiner* — Rodney Butler
(74) *Attorney, Agent, or Firm* — Artegis Law Group, LLP

(57) ABSTRACT

A navigation system is configured to generate a sequence of driving instructions for directing a driver of a vehicle from a current location to a final destination. The navigation system is configured to capture sensor data that reflects the field of view of the driver and to identify objects in that field of view. The navigation system then customizes the driving instructions to reference specific objects, thereby generating context-specific driving instructions. The navigation system is also configured to identify particular objects upon which the driver is focused, and to generate context-specific driving instructions relative to such objects of focus. The navigation system may also provide correction information to the driver upon determining that the driver has incorrectly focused on a different object than an object referenced in a context-specific driving instruction.

23 Claims, 20 Drawing Sheets

(56) References Cited

U.S. PATENT DOCUMENTS

2013/0278769 A1* 10/2013 Nix et al. .................. 348/148
2014/0077925 A1* 3/2014 Hamadallah ............... 340/4.12
2014/0236468 A1* 8/2014 Dave et al. ................. 701/300
2014/0244105 A1* 8/2014 Dariush et al. .............. 701/36
2014/0324336 A1* 10/2014 Prokhorov et al. .......... 701/445

OTHER PUBLICATIONS

Fletcher et al. "Correlating driver gaze with the road scene for driver assistance systems"; Robotics and Autonomous Systems, 52; Publication [online]. May 2005 [retrieved Jan. 16, 2015]. Retrieved from the Internet: <URL: http://people.csail.mit.edu/lukesf/publications/fletcherRAS05.pdf>; pp. 71-84.

Kim et al. "Simulated Augmented Reality Windshield Display as a Cognitive Mapping Aid for 8,16,20 Elder Driver Navigation"; ACM; Publication [online]. 2009. [retrieved Jan. 16, 2015]. Retrieved from the Internet: <URL: http://www.cmu.edu/qolt/Research/publications/2009Pubsikim_chi09.pdf>; pp. 1-10.

Fletcher et al. "Driver Inattention Detection based on Eye Gaze-Road Event Correlation"; 1-20 International Journal of Robotics Research, vol. 28, No. 6; Publication [online]. Jun. 2009 [retrieved Jan. 16, 2015]. Retrieved from the Internet: <URL: http://people.csail.mit.edu/lukesf/publications/fletcheriJRR09.pdf>; pp. 774-801.

* cited by examiner

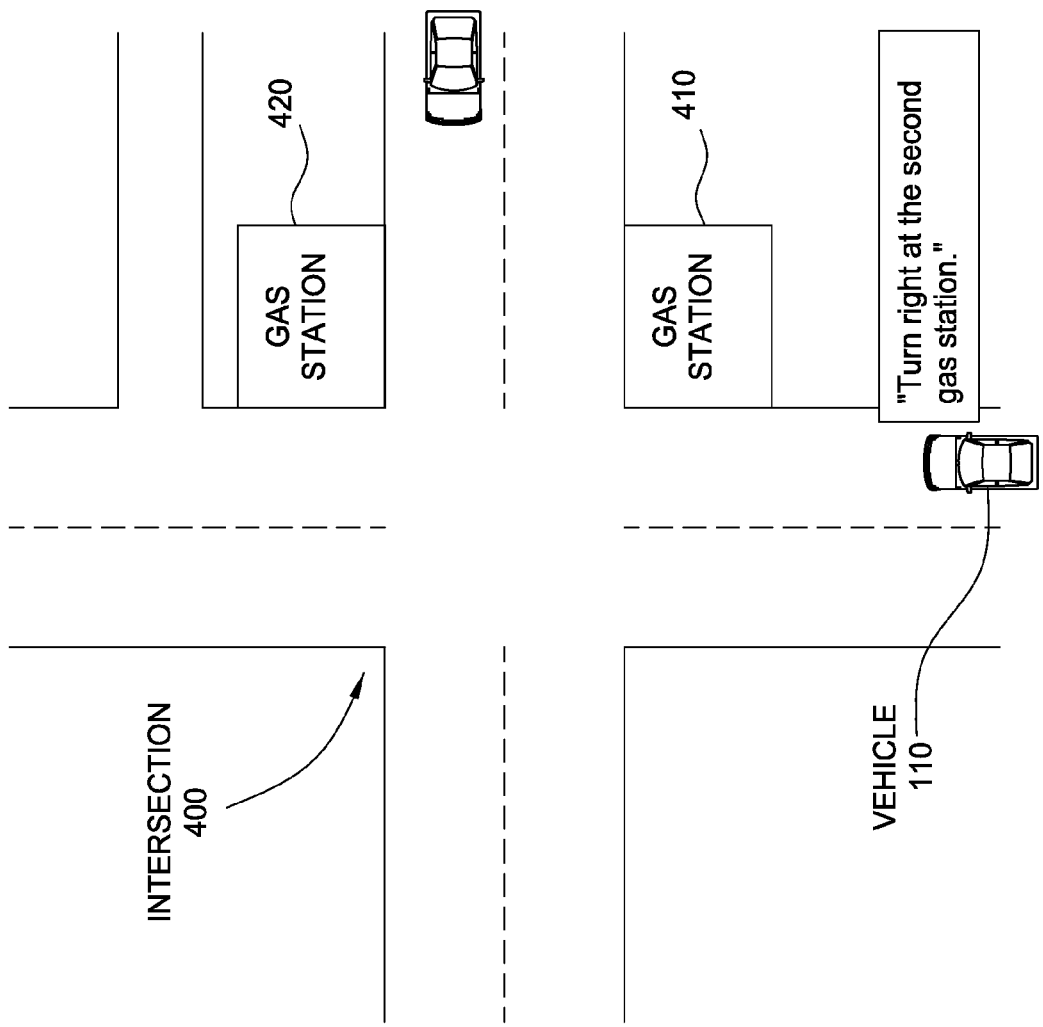

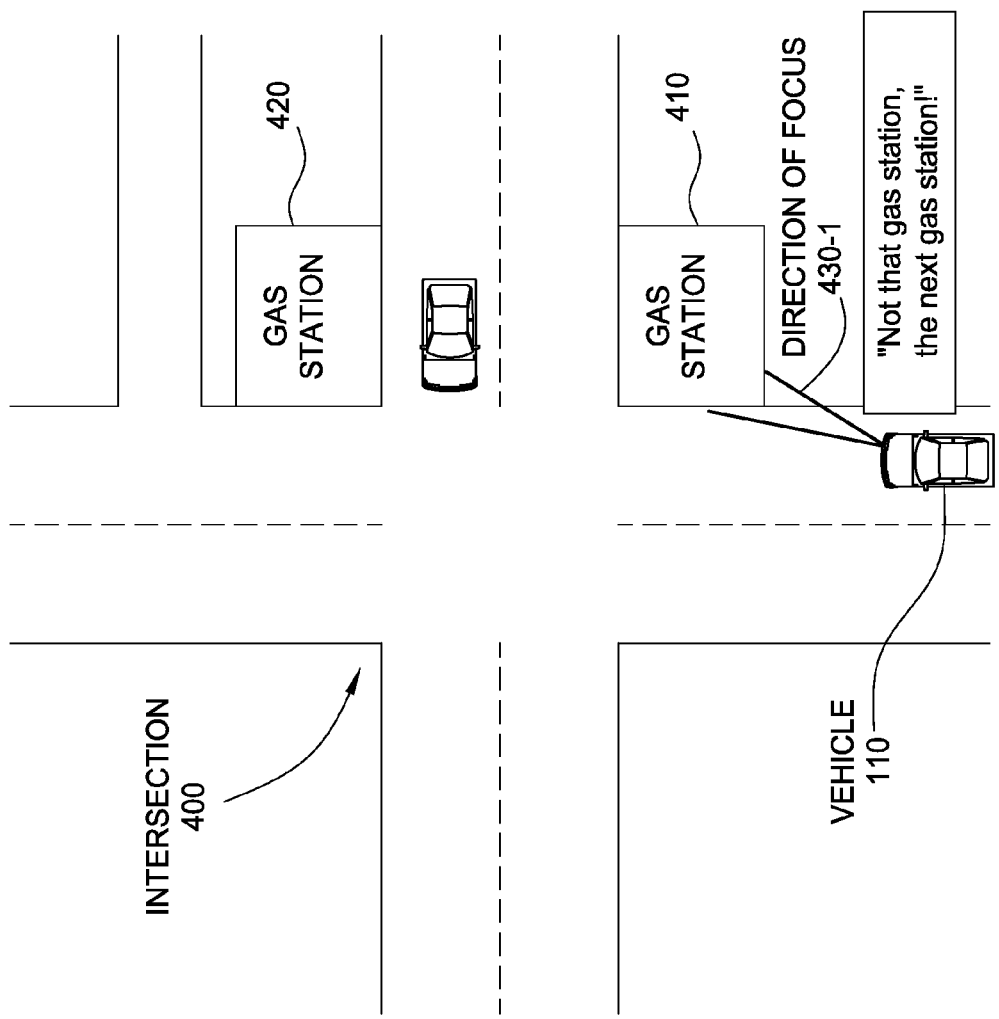

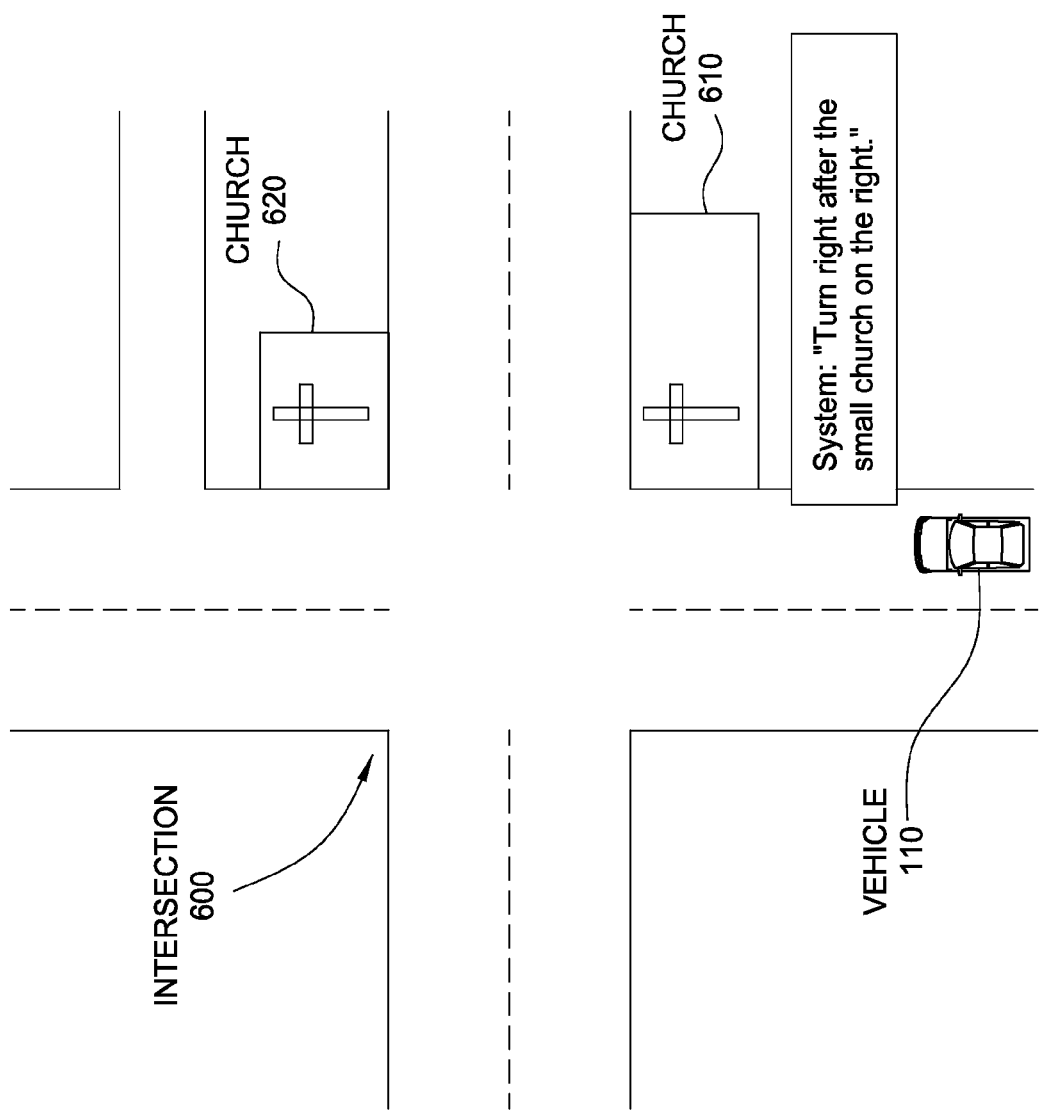

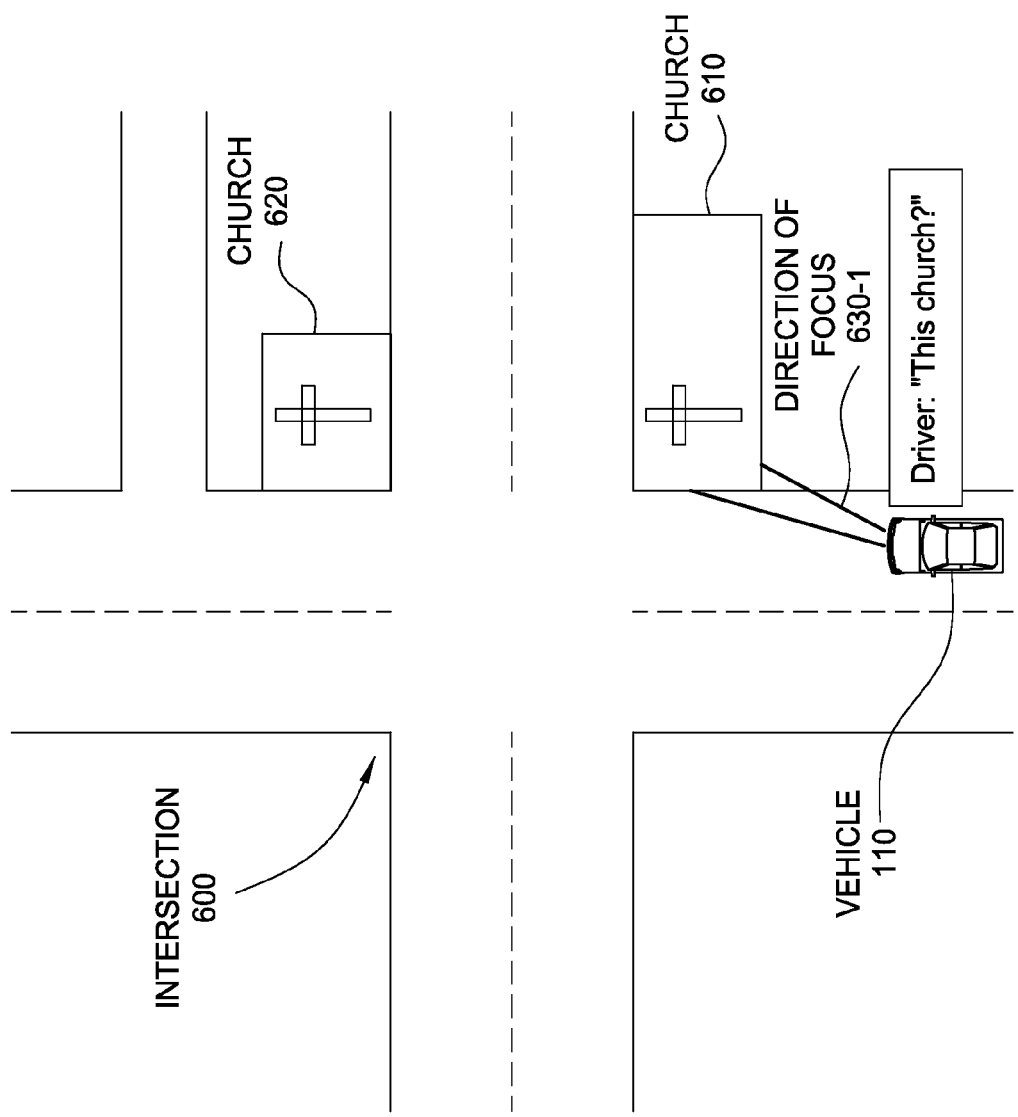

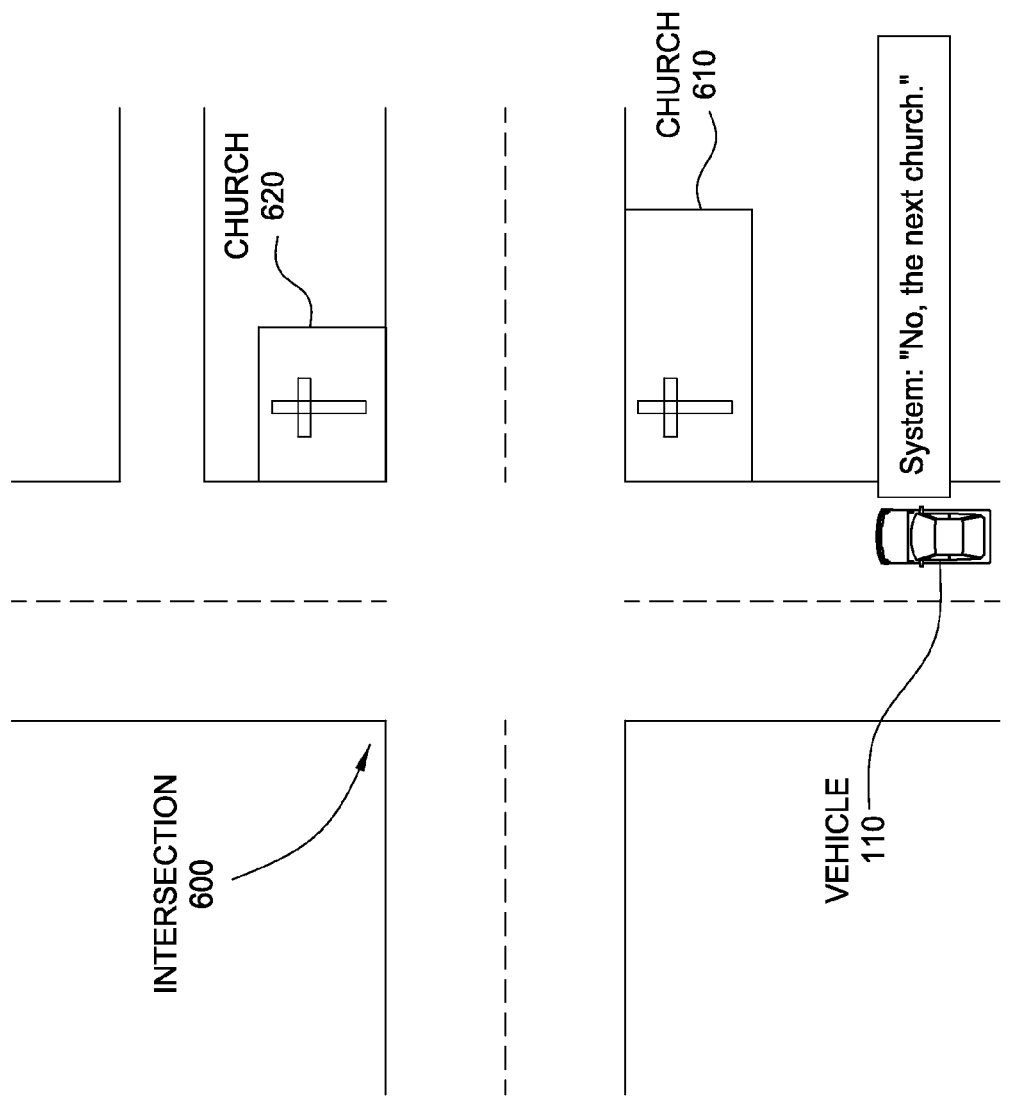

EYE GAZE ENABLED NAVIGATION SYSTEM

BACKGROUND

1. Field of the Embodiments of the Invention

Embodiments of the present invention relate generally to navigation systems and, more specifically, to an eye-gaze enabled navigation system.

2. Description of the Related Art

A conventional navigation system is capable of generating a sequence of driving instructions for directing the driver of a vehicle from a current location to a final destination. The driver follows each driving direction in the sequence by causing the vehicle to perform a specific navigation action, as dictated by the navigation system. For example, a given driving direction may specify that a left turn is required 500 feet ahead. In response, the driver would cause the vehicle to turn left after travelling 500 feet. Once a given driving direction has been successfully followed, the navigation system proceeds to the next driving direction in the sequence. This pattern of operation continues until the vehicle arrives at the final destination.

The basic functionality described above can be effective, provided that the driver interprets each direction correctly. However, various factors often contribute to the driver misinterpreting the driving directions. For example, driving directions that rely on measures of distance (such as in the above example) sometimes cannot easily be interpreted because drivers are not usually aware of the exact distances that vehicles travel in a given period of time. Furthermore, drivers are usually preoccupied with the physical act of driving and may not be able to spare the attention required for interpreting complex driving directions. Due to these factors, drivers that rely on conventional navigation systems sometimes become confused and, consequently, become lost.

Accordingly, what is needed in the art is a more effective technique for navigating a vehicle.

SUMMARY

One embodiment of the present invention sets forth a system configured to generate context-specific driving instructions for a driver of a vehicle, including at least one sensor configured to capture sensor data that reflects a field of view of the driver, a computing device configured to process the sensor data to identify a first object within the field of view of the driver and generate a context-specific driving instruction that references the first object, and at least one output device configured to output the context-specific driving instruction to the driver.

One advantage of the disclosed technique is that it enables context-specific driving instructions that are consistent with the visual context of the driver. Consequently, the driver may intuitively follow those instructions without distraction.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4C are conceptual diagrams illustrating an exemplary use-case where the navigation system of FIG. 1 instructs the driver of a vehicle relative to a stationary landmark, according to various embodiments of the present invention;

FIGS. 6A-6C are conceptual diagrams illustrating an exemplary use-case where the driver of a vehicle interacts with the navigation system of FIG. 1 to confirm a driving instruction, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
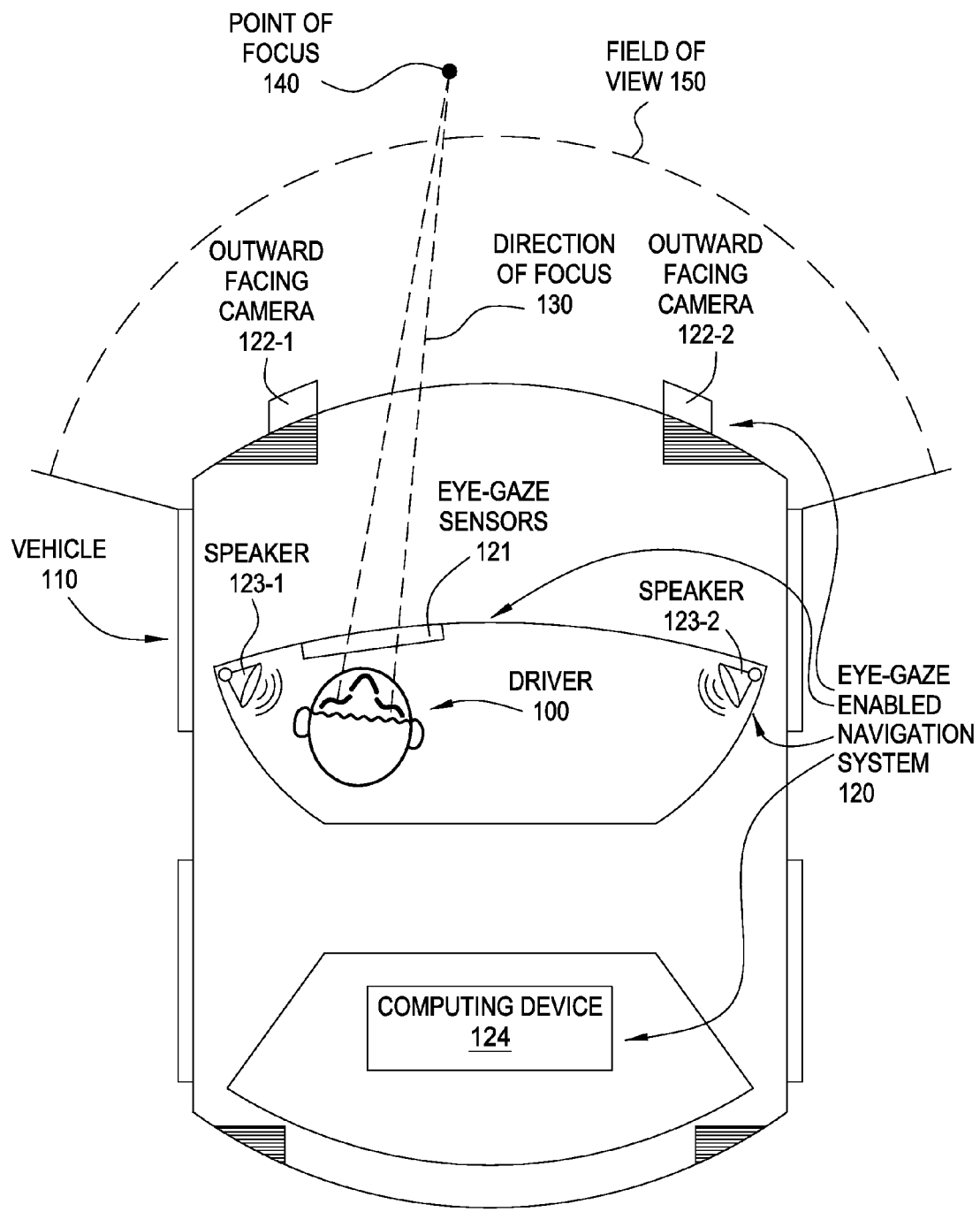
FIG. 1 illustrates a system configured to implement one or more aspects of embodiments of the present invention.

FIG. 1 illustrates an eye-gaze enabled navigation system 120 configured to implement one or more aspects of embodiments of the present invention. Navigation system 120 is configured to dictate context-specific driving instructions to a driver 100 of a vehicle 110. Navigation system 120 is also configured to dictate correction information to driver 100 that may aid driver 100 with interpreting those driving instructions. The driving instructions specifically reference real-world objects residing in the field of view of driver 100 and indicate a particular driving action to be performed relative to those real-world objects. The correction information may assist driver 100 with interpreting a driving instruction by specifying that a driving action should be performed relative to a real-world object towards which driver 100 is currently looking. In general, navigation system 120 is configured to assist driver 100 in driving to a particular destination relative to real-world objects in the field of view of driver 100.

As shown, driver 100 resides within vehicle 110 that includes various components of navigation system 120. In particular, navigation system 120 includes eye-gaze sensors 121, outward facing cameras 122-1 and 122-2, speakers 123-1 and 123-2, and a computing device 124. Eye-gaze sensors 121 are configured to determine a direction of focus 130 along which driver 100 may be looking. Eye gaze sensors 121 are further configured to determine a point of focus 140 that represents a particular depth at which driver 100 may be looking along direction of focus 130. Field of view 150 represents a panorama within which driver 100 may visually perceive objects at any given time. As such, point of focus 140 generally resides within field of view 150. Eye-gaze sensors 121 may determine point of focus 140 via eyeball tracking sensors as well as head tracking sensors. Computing device 124 is configured to process data from those sensors to determine direction of focus 130 and point of focus 140 within field of view 150. Persons skilled in the art will generally be familiar with a wide variety of techniques for determining direction of focus 130 and point of focus 140. As such, those techniques will not be exhaustively listed herein.

Outward facing cameras 122 are configured to capture video data that reflects a visual panorama surrounding a portion of vehicle 110, including field of view 150 associated with driver 100. Computing device 124 is configured to process the video data captured by outward facing cameras 122 and to apply computer vision techniques to identify a set of objects within field of view 150 of driver 100. In doing so, computing device 124 may also analyze a parallax between video data captured by outward facing cameras 122-1 and 122-2 in order to determine a depth value associated with each identified object. In further embodiments of the present invention, outward facing cameras 122 may include other types of sensors beyond cameras, including, but not limited to, infrared sensors, ultraviolet sensors, ultrasound-based sensors, laser-based sensors, SONAR and/or LIDAR devices, range sensors, and devices capable of generating a depth map, such as, e.g., a depth sensor or a time-of-flight camera, among others. As a general matter, outward facing cameras 122 may include any type of sensor capable of identifying a set of objects (and corresponding depth values) within field of view 150 of driver 100, and outward facing cameras 122 represent just one example of such a sensor.

Speakers 123 are configured to output audio that dictates context-specific driving instructions and correction information to driver 100. Speakers 123 may be stereo speakers typically found in conventional automobiles, dedicated speakers associated with navigation system 120, or other types of audio output devices. In further embodiments of the invention, speakers 123 may also include other types of output devices beyond audio output devices, including visual, textual, and/or tactile output devices, among others. Computing device 124 is configured to generate driving instructions and correction information and to then synthesize audio reflecting that information using computer vocalization techniques.

Computing device 124 may be any technically feasible device capable of processing data, including a laptop computer, a cell phone device, a dedicated navigation unit, a tablet computer, and so forth. As a general matter, computing device 124 is responsible for managing all functionality of navigation system 120 described herein. In operation, computing device 124 is configured to interact with driver 100 in order to determine a final destination to which driver 100 wishes to navigate. Computing device 124 then determines the current location of vehicle 110 based on global positioning service (GPS) data or other location services. Computing device 124 is configured to generate a sequence of driving instructions to direct driver 100 from the current location to the final destination. In doing so, computing device 124 may rely on a database of roadway information that could be, e.g. cloud-based and remotely accessible, or, alternatively, stored within computing device 124. Computing device 124 may then modify each such driving instruction to specifically reference real-world objects in field of view 150 of driver 100, thereby generating context-specific driving instructions. Computing device 124 may also provide correction information to driver 100 based on direction of focus 130 and point of focus 140, as determined by eye-gaze sensors 121. An exemplary computing device 124 is described in greater detail below in conjunction with FIG. 10.

Navigation system 120 may generally operate according to different embodiments. In a first embodiment of navigation system 120, navigation system 120 provides a driving instruction to driver 100 that references a real-world object in field of view 150 of driver 100. Should the driver 100 fail to look directly at the real-world object, navigation system 120 then provides correction information to driver 100 in order to cause driver 100 to look at the appropriate real-world object. The first embodiment of navigation system 120 is described in greater detail below in conjunction with FIGS. 3A-4C and 6A-8. In a second embodiment of navigation system 120, navigation system 120 identifies a real-world object towards which driver 100 is already looking, and then generates a driving instruction that specifically references that real-world object. The second embodiment is described in greater detail below in conjunction with FIGS. 5A-5B and 9. Persons skilled in the art will recognize that the first and second embodiments described herein may also be combined with one another in any technically feasible fashion. In either embodiment, navigation system 120 generally operates according to various data and processing stages that are described in greater detail below in conjunction with FIG. 2.

Figure 2:
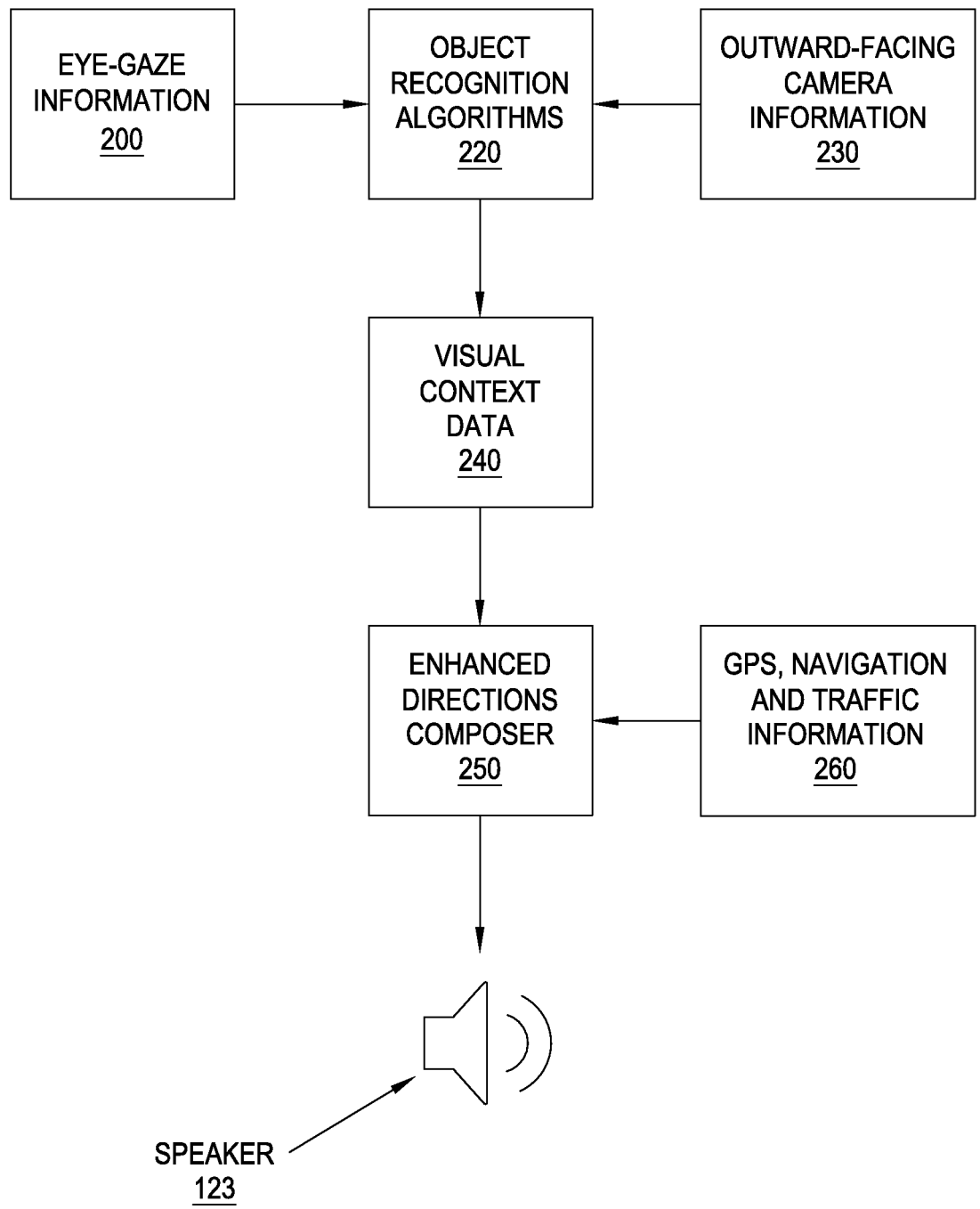
FIG. 2 is a diagram of the data and processing stages implemented by the navigation system of FIG. 1 to generate context-specific driving directions, according to various embodiments the present invention.

FIG. 2 is a diagram of the data and processing stages implemented by the navigation system of FIG. 1 to generate context-specific driving instructions, according to various embodiments the present invention. The data flow diagram shown in FIG. 2 includes eye gaze information 200, object recognition algorithms 220, outward facing camera information 230, visual context data 240, enhanced directions composer 250, and GPS, traffic, and navigation information 260. Each of the aforementioned blocks represents data that is gathered or generated by navigation system 120, or, alternatively, a processing stage that navigation system 120 implements to process that data.

Navigation system 120 is configured to generate eye gaze information 200 via eye gaze sensors 121. Eye gaze information 200 may include data that specifies direction of focus 130 as well as point of focus 140. Navigation system 120 is also configured to generate outward facing camera information 220 via outward facing cameras 122. Outward facing camera information 230 may include multiple streams of video data captured by outward facing cameras 122-1 and 122-2, and may thus represent a stereoscopic representation of field of view 150 of driver 100.

Navigation system 120 is configured to implement one or more object recognition algorithms 220 in order to process eye gaze information 200 and outward facing camera information 230. In doing so, navigation system 120 may implement computer vision techniques in order to designate particular regions of the stereoscopic representation mentioned above as being associated with a particular type of real-world object. For example, and without limitation, by implementing object recognition algorithms 220, navigation system 120 could determine that a particular portion of the stereoscopic representation is associated with a car. Navigation system 120 may further implement object recognition algorithms 220 to determine a depth value for each identified object. Returning to the above example, navigation system 120 could determine that the identified car resides approximately 30 feet from outward facing cameras 122. Navigation system 120 may also apply object recognition algorithms 220 to identify specific real-world objects residing at point of focus 140, i.e., real-world objects onto which driver 100 is currently focused. In doing so, navigation system 120 may correlate point of focus 140 with a specific region of the stereoscopic representation of field of view 150 of driver 100, where that specific region includes one or more real-world objects identified via object recognition algorithms 220. With the aforementioned techniques, navigation system 120 generates visual context data 240.

Visual context data 240 generally represents a set of objects within field of view 150 of driver 100 that have been identified via object recognition algorithms 220 in the fashion described above. Visual context data 240 could include, for example, and without limitation, an enhanced version of the stereoscopic representation captured by outward facing cameras 230 that indicates particular object types for different regions of that representation. The enhanced version could also include data specifying direction of focus 130 and point of focus 140 within the stereoscopic representation, along with an indication of a specific real-world object associated with point of focus 140. Navigation system 120 is configured to process visual context data 240 with enhanced directions composer 250 in order to generate context-specific driving directions.

In operation, enhanced directions composer 250 is configured to access GPS, navigation, and traffic information 260 and to generate a set of driving instructions for directing driver 100 from a current location to a final destination. Driver 100 could select the final destination, for example, and without limitation, by interacting with a graphical user interface (GUI) provided by navigation system. The set of driving instructions may be generated by conventional techniques, and may rely on existing application programming interfaces (APIs) for querying public cloud-based engines that generate driving instructions. Enhanced directions composer 250 then modifies a current instruction in the set of driving instructions to include references to real-world objects indicated by visual context data 240, thereby generating a context-specific driving instruction. The real-world object could be any object in field of view 150 of driver 100, or an object of focus towards which driver 100 is already looking. Enhanced driving directions composer 250 then outputs the context-specific driving direction to driver 100 via speakers 123.

In a specific example of the functionality of enhanced directions composer 250, and without limitation, the current instruction in the set of instructions could indicate that a left turn should be performed 500 feet ahead. Enhanced directions composer 250 typically acquires the particular instruction to turn and the distance at which the turn should be performed from GPS, navigation, and traffic information 260. Enhanced directions composer 250 could then identify, from within visual context data 240, that a blue car is parked on the left side of the street approximately 500 feet ahead. Enhanced directions composer 250 would then modify the current instruction to indicate that a left turn should be performed after the blue car. Enhanced directions composer 250 would then dictate the context-specific driving instruction to driver 100.

In addition, enhanced directions composer 250 may also provide correction information to driver 100 in situations where driver 100 fails to look at the real-world object referenced in the context-specific driving instruction or looks at an incorrect object. Returning to the above example, should driver 100 fail to look at the blue car referenced in the context-specific instruction, and instead looks at a red car, enhanced directions composer 250 could generate correction information instructing driver 100 that the red car is, in fact, the wrong car. Enhanced directions composer 250 could also generate another context-specific driving instruction that includes a more detailed reference to real-world objects in field of view 150 of driver 100. For example, and without limitation, enhanced directions composer 250 could instruct driver 100 to turn left at the blue car next to the green house.

Enhanced directions composer 250 may also provide driving instructions to driver 100 that specifically reference objects of focus towards which driver 100 is already looking. For, enhanced directions composer 250 could determine, based on visual context data 240, that driver 100 is looking ahead to an intersection. Enhanced directions composer 250 could then instruct driver 100 that a left turn is needed at the intersection where driver 100 is currently looking. The different techniques described thus far may also be combined with one another in any technically feasible fashion. For example, and without limitation, enhanced directions composer 250 could provide context-specific driving instructions based on either real-world objects or objects of focus towards which driver 100 is looking. Enhanced directions composer 250 could also provide correction information based on either real-world objects or objects of focus towards which driver 100 is looking.

As a general matter, navigation system 120 is configured to rely on the various data and processing stages described above in conjunction with FIG. 2 in order to generate different types of context-specific driving instructions for driver 100. The particular types of context-specific driving instructions may vary across different use-cases. Each of FIGS. 3A-3D, 4A-4C, 5A-5B, 6A-6C, and 7A-7C below illustrates a different use-case that may occur as navigation engine 120 directs driver 100 to a final destination. One skilled in the art will recognize that the different use-cases described herein are exemplary in nature only and are in no way intended to limit the scope of the present invention.

Figure 3A:
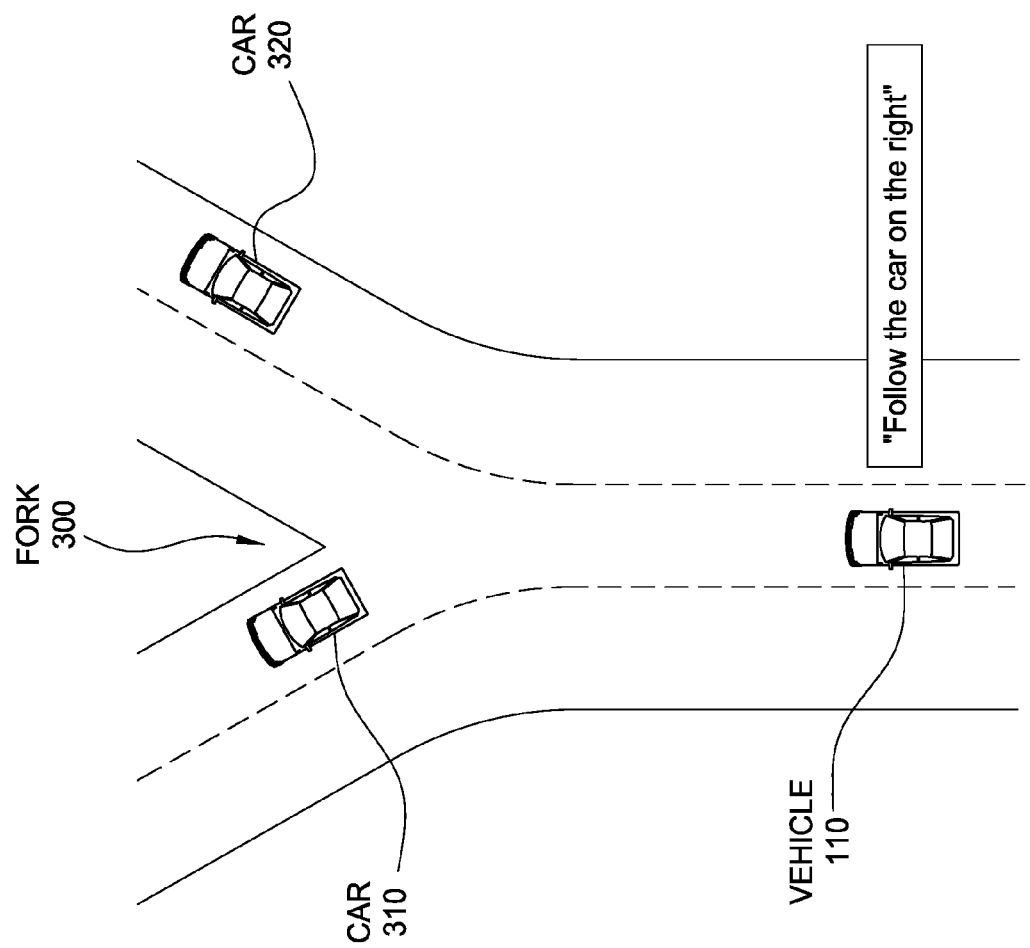
FIGS. 3A-3D are conceptual diagrams illustrating an exemplary use-case where the navigation system of FIG. 1 instructs the driver of a vehicle relative to a moving vehicle, according to various embodiments of the present invention.

FIG. 3A is a conceptual diagram illustrating an exemplary use-case scenario where navigation system 120 of FIG. 1 instructs driver 100 relative to a moving vehicle, according to various embodiments of the present invention. As shown, a car 110 approaches a fork 300. A car 310 bears to the left-hand side of fork 300, while another car 320 bears to the right-hand side of fork 300.

Navigation system 120 is configured to generate a set of driving instructions that reflects a particular sequence of driving actions for guiding vehicle 110 to a final destination. A current driving instruction could indicate that the right-hand fork should be followed. Navigation system 120 generates visual context data that indicates the presence of both cars 310 and 320. Navigation system 120 then generates a context-specific driving instruction indicating that the car on the right should be followed, in accordance with the original driving instruction. The context-specific driving instruction thus provides additional contextual clues that assist driver 100 in correctly performing the driving action associated with the original driving instruction. However, driver 100 could still misinterpret the context-specific driving instruction, and may not immediately look at car 320, as described below in conjunction with FIG. 3B.

Figure 3B:
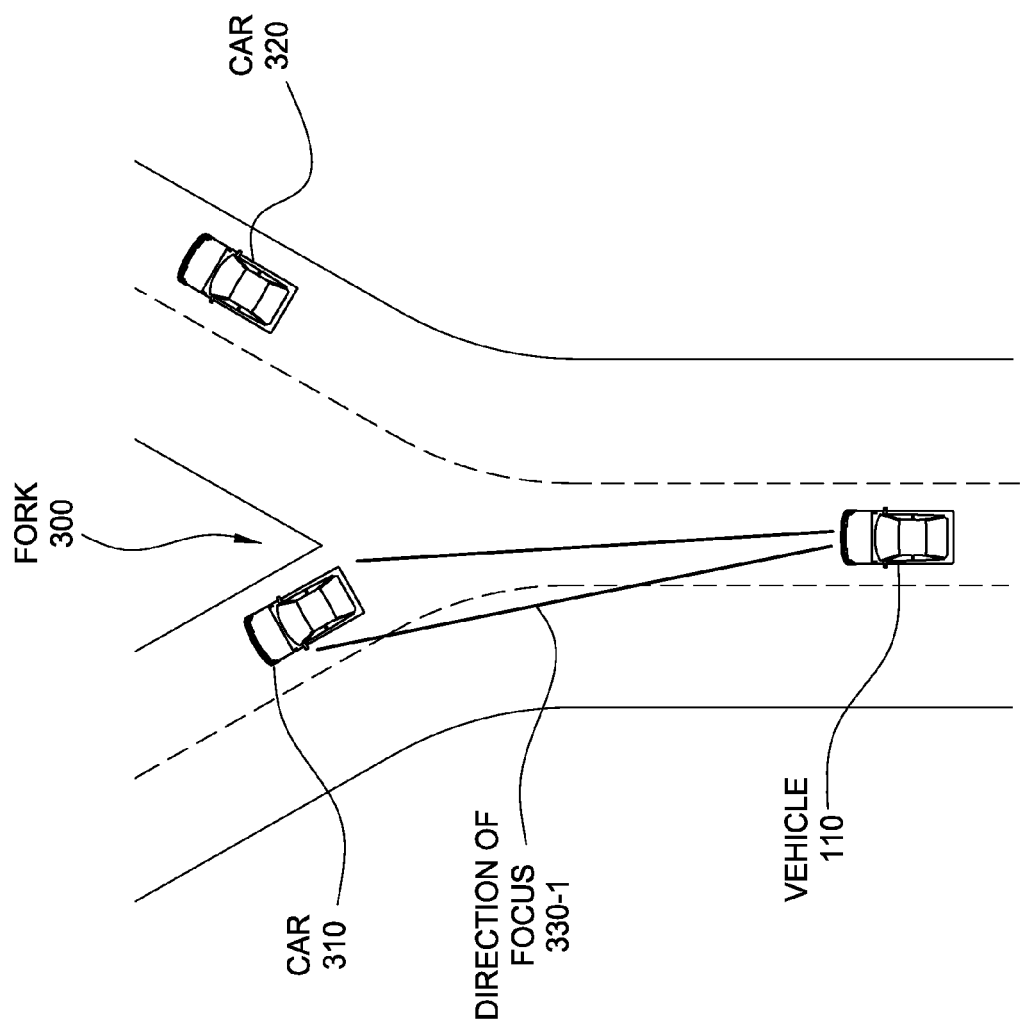

As shown in FIG. 3B, a direction of focus 330-1 of driver 100 is aligned with car 310 (the left-hand car) and not car 320 (the right-hand car) that was referred to by navigation system 120 in the context-specific direction. In other words, driver 100 is looking at the wrong car. Navigation system 120 is configured to determine direction of focus 330-1 via eye-gaze sensors 121, and to then identify that driver 100 is looking at car 310 instead of car 320. Navigation system 120 then generates correction information to cause driver 100 to look at the correct car, as described below in conjunction with FIG. 3C.

Figure 3C:
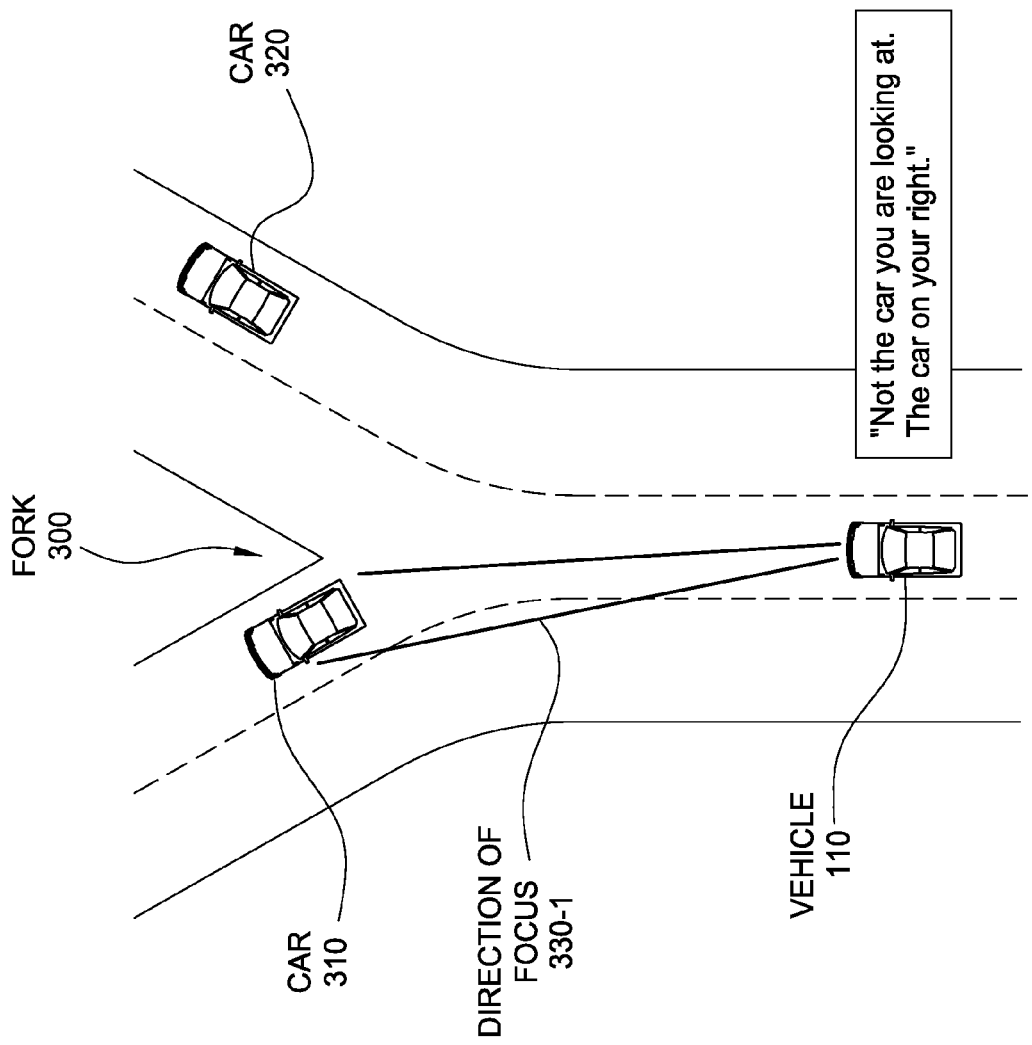
Figure 3D:
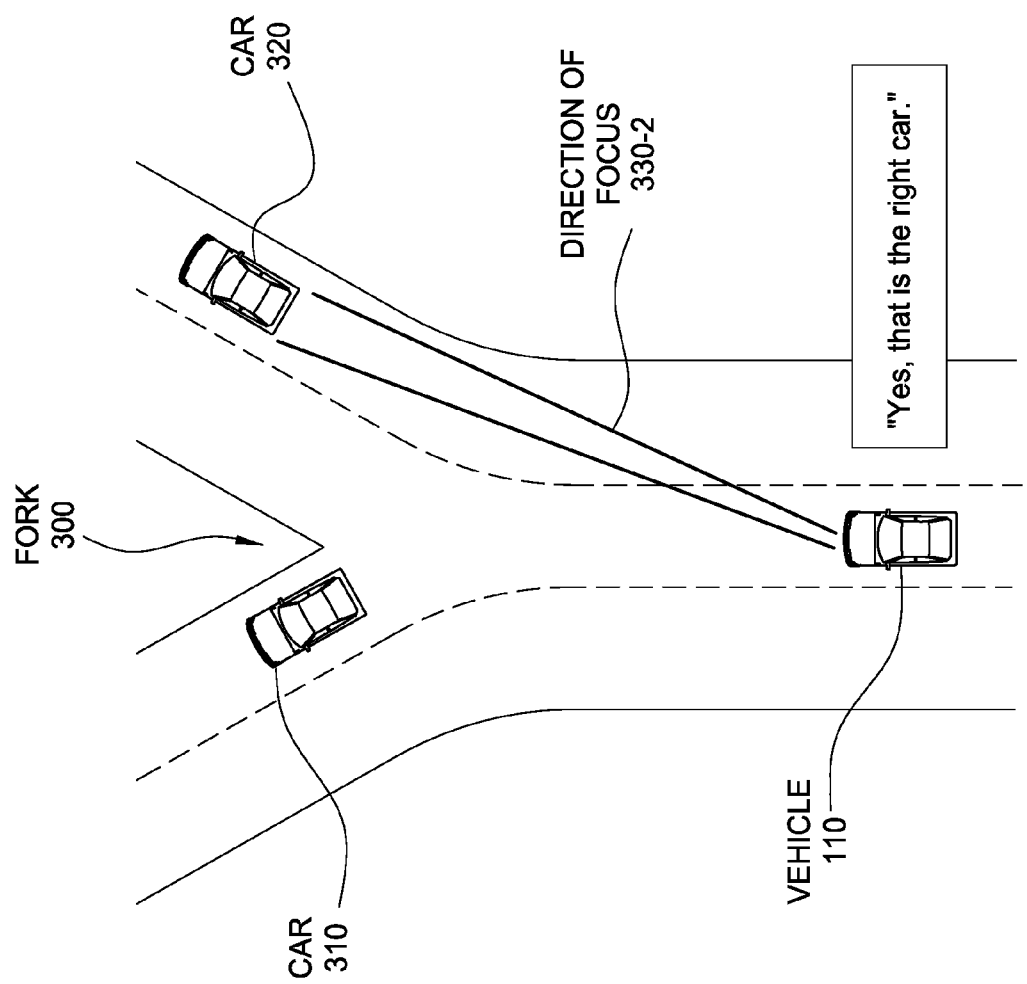

As shown in FIG. 3C, navigation system 120 indicates to driver 100 that the car at which driver 100 is looking (car 310) is, in fact, the wrong car, and that the correct car (car 320), is on the right-hand side. Driver 100 may then look towards car 320 along direction of focus 330-2, as shown in FIG. 3D. As also shown in FIG. 3D, navigation system 120 may generate a confirmation message indicating that driver 100 is looking at the correct car. With this approach, navigation system 120 provides driver 100 with context-specific driving instructions that include more relevant contextual information compared to traditional driving instructions. In addition, when navigation system 120 determines that driver 100 may have misinterpreted a given driving instruction, navigation system 120 attempts to correct that interpretation by providing additional information to driver 100.

Navigation system 120 may also generate context-specific instructions relative to real-world objects that may have a fixed location. Those objects may be identifiable within visual context data generated by navigation system 120, or identifiable via GPS or external mapping databases, and may include structures, businesses, and so forth, as described in greater detail below in conjunction with FIGS. 4A-4C.

FIG. 4A is a conceptual diagram illustrating an exemplary use-case scenario where navigation system 120 of FIG. 1 instructs driver 100 of vehicle 110 relative to a stationary landmark, according to various embodiments of the present invention. As shown, vehicle 110 approaches intersection 400, at which two different gas stations are located, gas station 410 and gas station 420.

Navigation system 120 is configured to proceed to a subsequent driving instruction in the set of driving instructions discussed above in conjunction with FIGS. 3A-3D. A current driving instruction could indicate that a right turn should be performed just after intersection 400. Navigation system 120 generates visual context data that indicates the presence of both gas stations 410 and 420. Navigation system 120 then generates a context-specific driving instruction indicating that a right-hand turn should be performed after the second gas station (420). However, driver 100 may not immediately look at the correct gas station, as described below in conjunction with FIG. 4B.

Figure 4C:
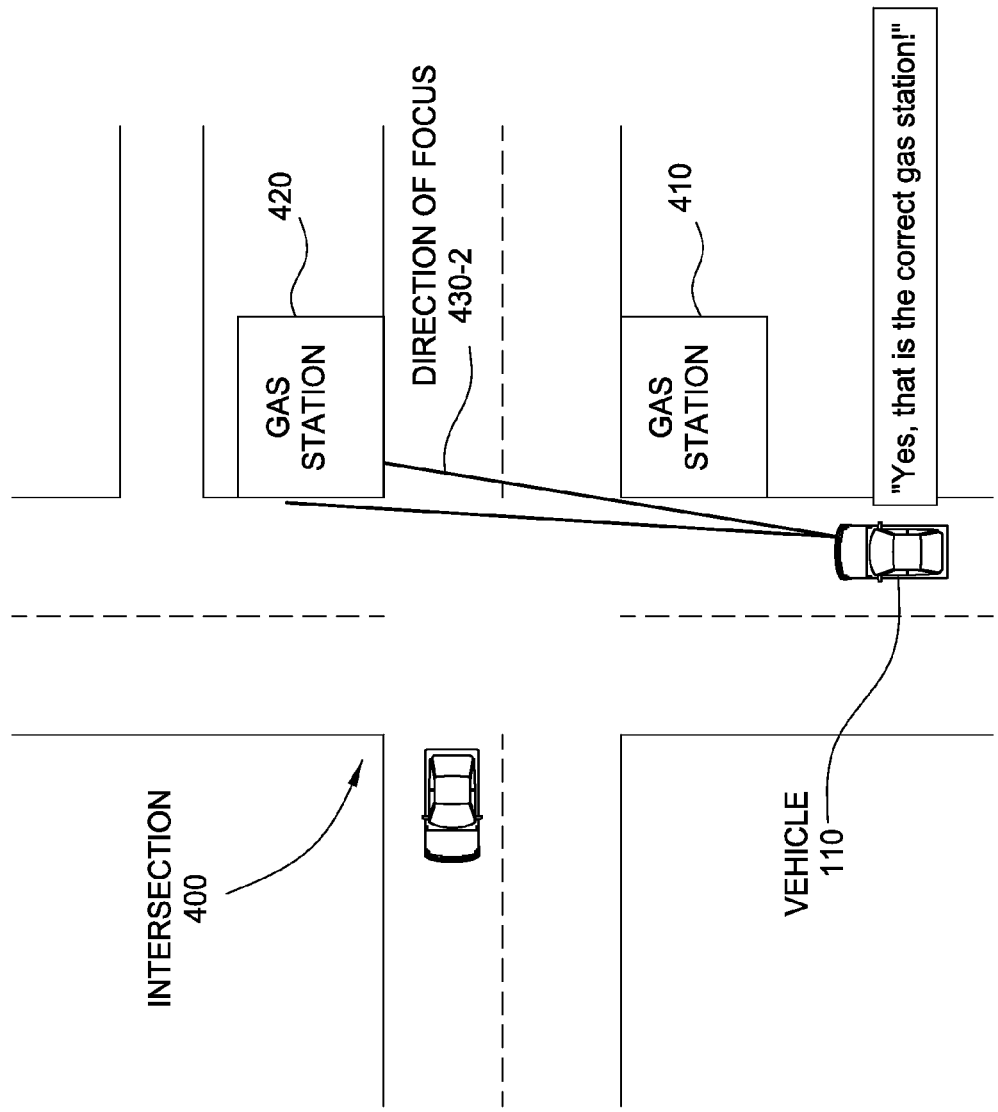

As shown in FIG. 4B, a direction of focus 430-1 of driver 100 is aligned with gas station 410 (the first gas station) and not gas station 420 (the second gas station) that was referred to by navigation system 120 in the context-specific driving instruction. In other words, driver 100 is looking at the wrong gas station. Navigation system 120 is configured to determine direction of focus 430-1 via eye-gaze sensors 121, and to then identify that driver 100 is looking at gas station 410 instead of gas station 420. Navigation system 120 then generates correction information to cause driver 100 to look at the correct gas station, as is shown. Driver 100 may then look towards gas station 420 along direction of focus 430-2 and, as shown in FIG. 4C, navigation system 120 may provide a confirmation message indicating that driver 100 is looking at the correct gas station.

Navigation system 120 may also generate context-specific driving instructions that refer to real-world objects upon which driver 100 is already focused, as described in greater detail below in conjunction with FIGS. 5A-5B.

Figure 5A:
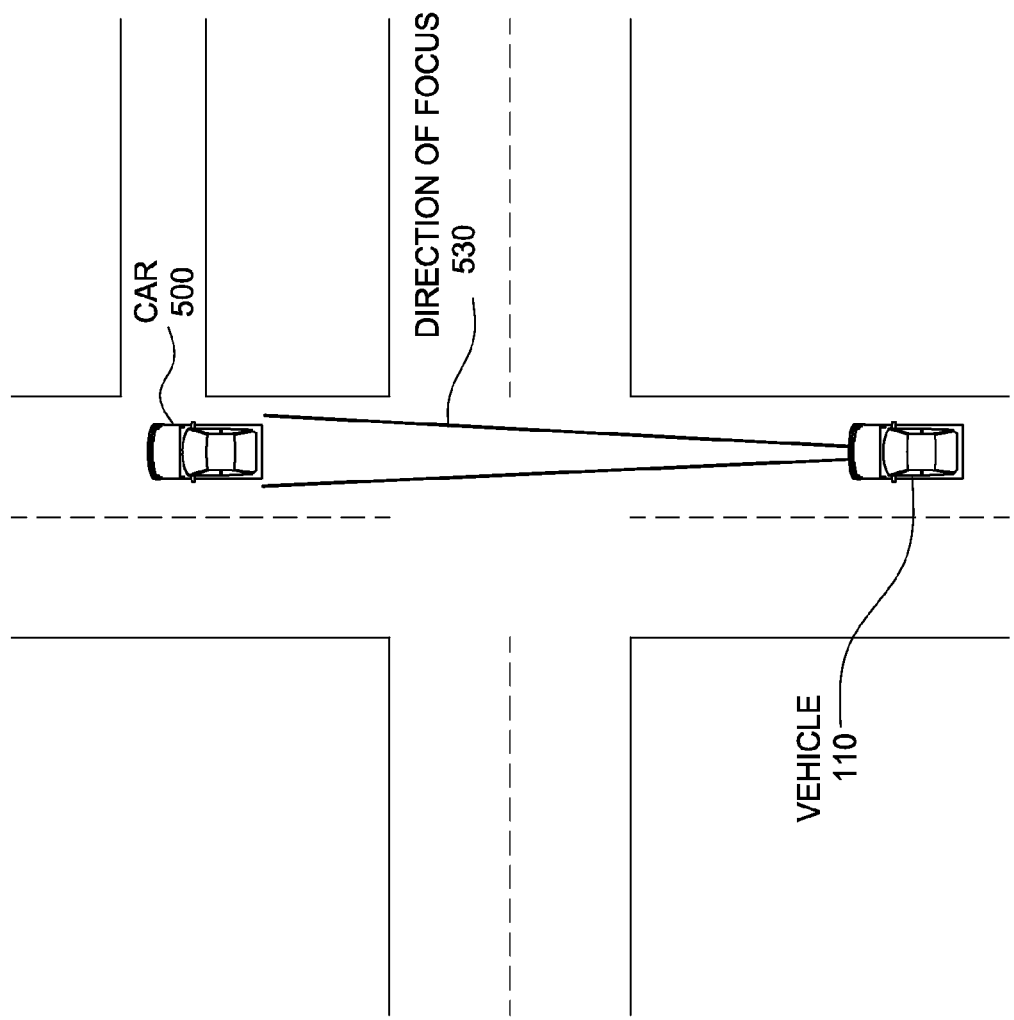
FIGS. 5A-5B are conceptual diagrams illustrating an exemplary use-case where the navigation system of FIG. 1 instructs the driver of a vehicle relative to a moving landmark at an instance in time, according to various embodiments of the present invention.
Figure 5B:
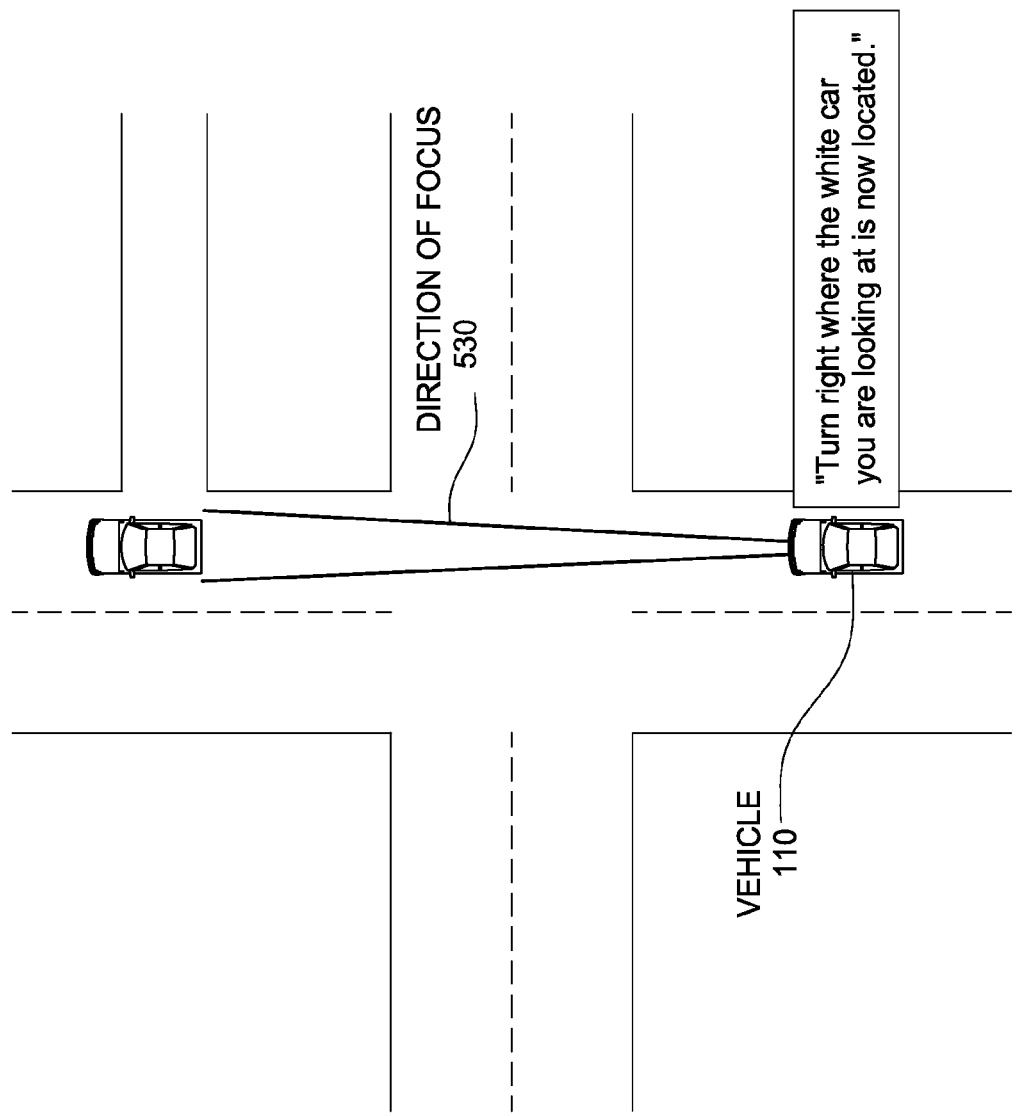

FIG. 5A is a conceptual diagram illustrating another exemplary use-case scenario where navigation system 120 of FIG. 1 instructs driver 100 of vehicle 110 relative to a moving landmark at an instance in time, according to various embodiments of the present invention. As shown, vehicle 110 follows a car 500. A direction of focus 530 of driver 100 is aligned with car 500.

Similar to above, navigation system 120 is configured to proceed to a subsequent driving instruction in the set of driving instructions. A current driving instruction could indicate that a right turn should be performed 100 feet ahead of vehicle 110. Navigation system 120 generates visual context data that indicates the presence of car 500. Navigation system 120 is configured to determine that the right turn should be performed at the current location of car 500, which happens to be 100 feet ahead of vehicle 110. Navigation system 120 then generates a context-specific driving instruction indicating that a right-hand turn should be performed at the current location of car 500, as shown in FIG. 5B. With the approach described in conjunction with FIGS. 5A-5B, navigation system 120 may proactively provide context-specific driving instructions that reference real-world objects upon which driver 100 is already focused.

Navigation system 120 is also configured to interact with driver 100 in order to confirm that driver 100 has interpreted a context-specific driving instruction correctly, as described in greater detail below in conjunction with FIGS. 6A-6C.

FIG. 6A is a conceptual diagram illustrating an exemplary use-case scenario where driver 100 of vehicle 110 interacts with navigation system 120 to confirm a driving instruction, according to various embodiments of the present invention. As shown, vehicle 110 approaches intersection 600, at which two different churches are located, a large church 610 and a small church 620.

Similar to above, navigation system 120 is configured to proceed to a subsequent driving instruction in the set of driving instructions. A current driving instruction could indicate that a right turn should be performed just after intersection 600. Navigation system 120 generates visual context data that indicates the presence of both churches 610 and 620. Navigation system 120 then generates a context-specific driving instruction indicating that a right-hand turn should be performed after the smaller of the two churches (620). Driver 100 may not immediately understand which of churches 610 and 620 is the smaller of the two. However, navigation system 120 is configured to interact with driver 100 in order to confirm that driver 100 sees the correct church, as described below in conjunction with FIG. 6B.

As shown in FIG. 6B, a direction of focus 630-1 of driver 100 is aligned with church 610. Driver 100 may query navigation system 120 in order to confirm that driver 100 is, in fact, looking at the smaller of the two churches 610 and 620. Navigation system 120 determines that driver 100 is actually looking at the wrong church and, in response, provides correction information to driver 100, as described below in conjunction with FIG. 6C.

As shown in FIG. 6C, navigation system 120 provides correction information that distinguishes church 610 from 620 and clarifies that the right turn should be performed after church 620, instead of church 610. Navigation system 120 is generally configured to provide additional correction information to driver 100 until driver 100 focuses on a particular real-world object associated with a current context-specific driving instruction.

Navigation system 120 may be implemented to assist driver 100 with performing a driving action associated with a current driving instruction, and may also be implemented to guide driver 100 to a final destination, as described below in conjunction with FIGS. 7A-7C.

Figure 7A:
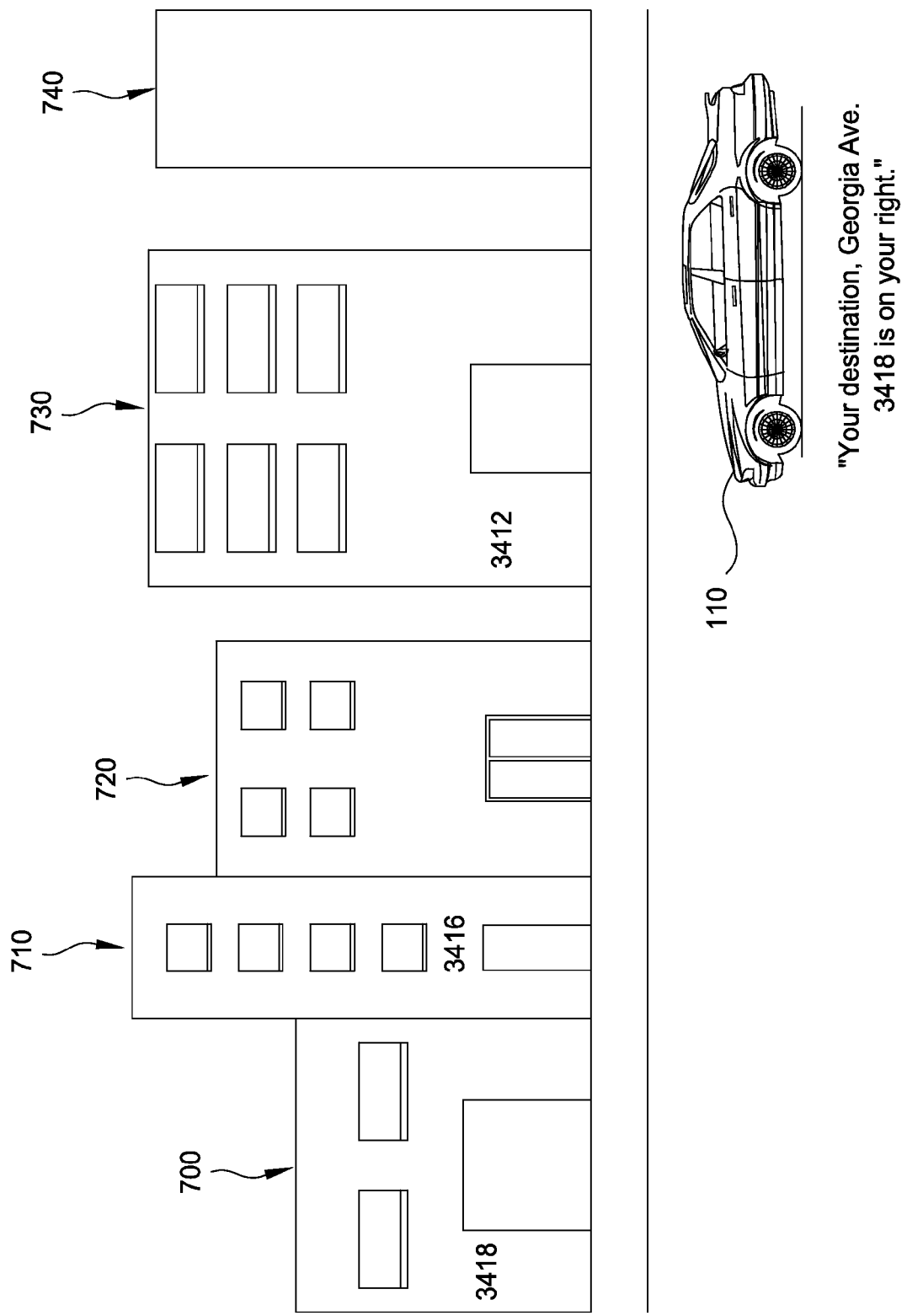
FIGS. 7A-7C are conceptual diagrams illustrating an exemplary use-case where the navigation system of FIG. 1 guides the driver of a vehicle to a final destination, according to various embodiments of the present invention.

FIG. 7A is a conceptual diagram illustrating an exemplary use-case scenario where navigation system 120 of FIG. 1 guides driver 100 of vehicle 110 to a final destination, according to various embodiments of the present invention. As shown, vehicle 110 approaches a building 700 that represents the final destination of driver 100. Building 700 resides among other buildings 710, 720, 730, and 740, as is shown.

Similar to above, navigation system 120 is configured to proceed to a subsequent driving instruction in the set of driving instructions. The subsequent driving instruction could be a final driving direction that indicates the address of the final destination. Navigation system 120 generates visual context data that indicates the presence of buildings 700, 710, 720, 730, and 740. Navigation system 120 then generates a context-specific driving instruction indicating that the final destination is on the right-hand side of vehicle 110. However, driver 100 may misinterpret the context-specific driving instruction and look towards the wrong building, as described below in conjunction with FIG. 7B.

Figure 7B:
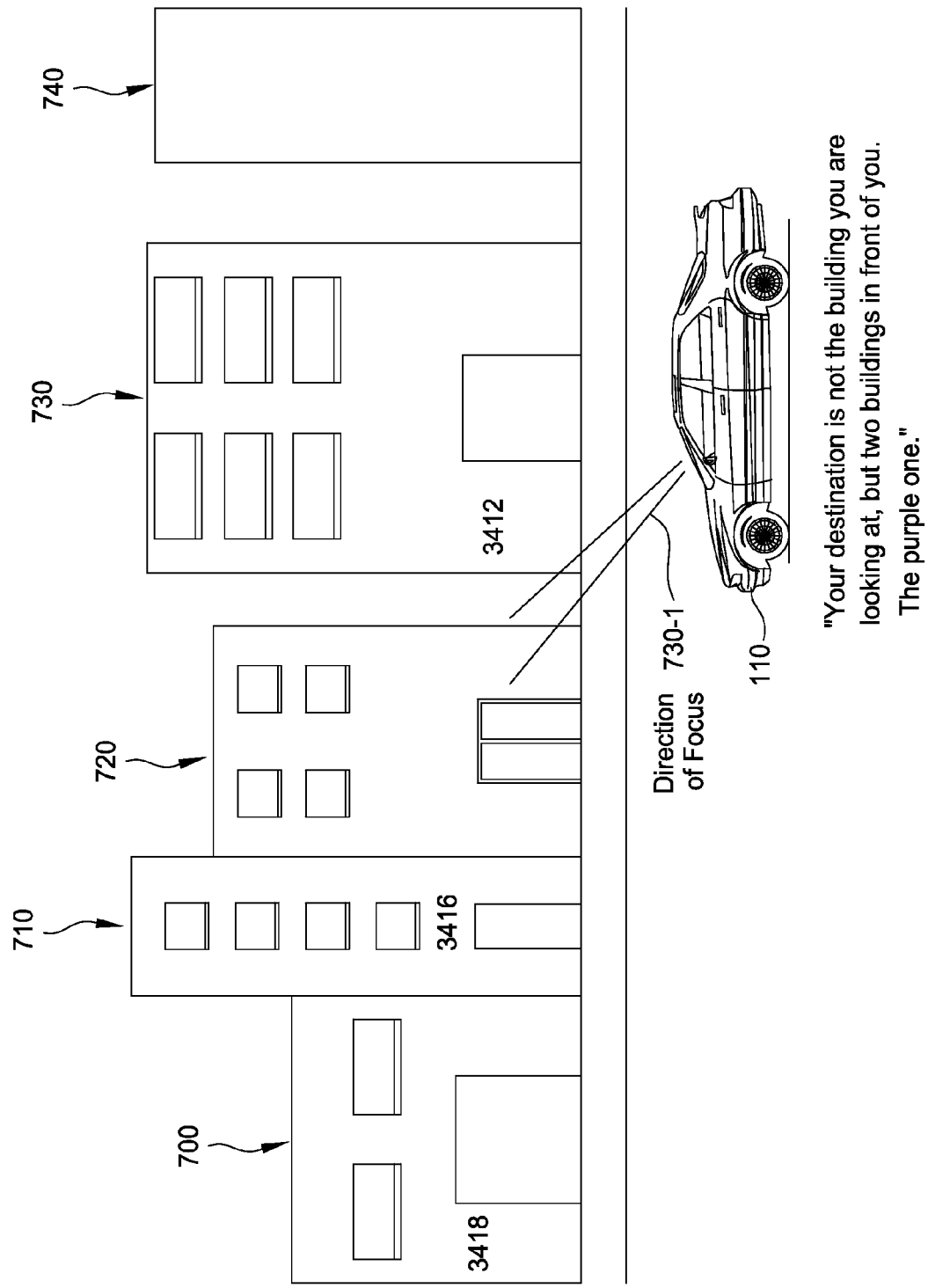
Figure 7C:
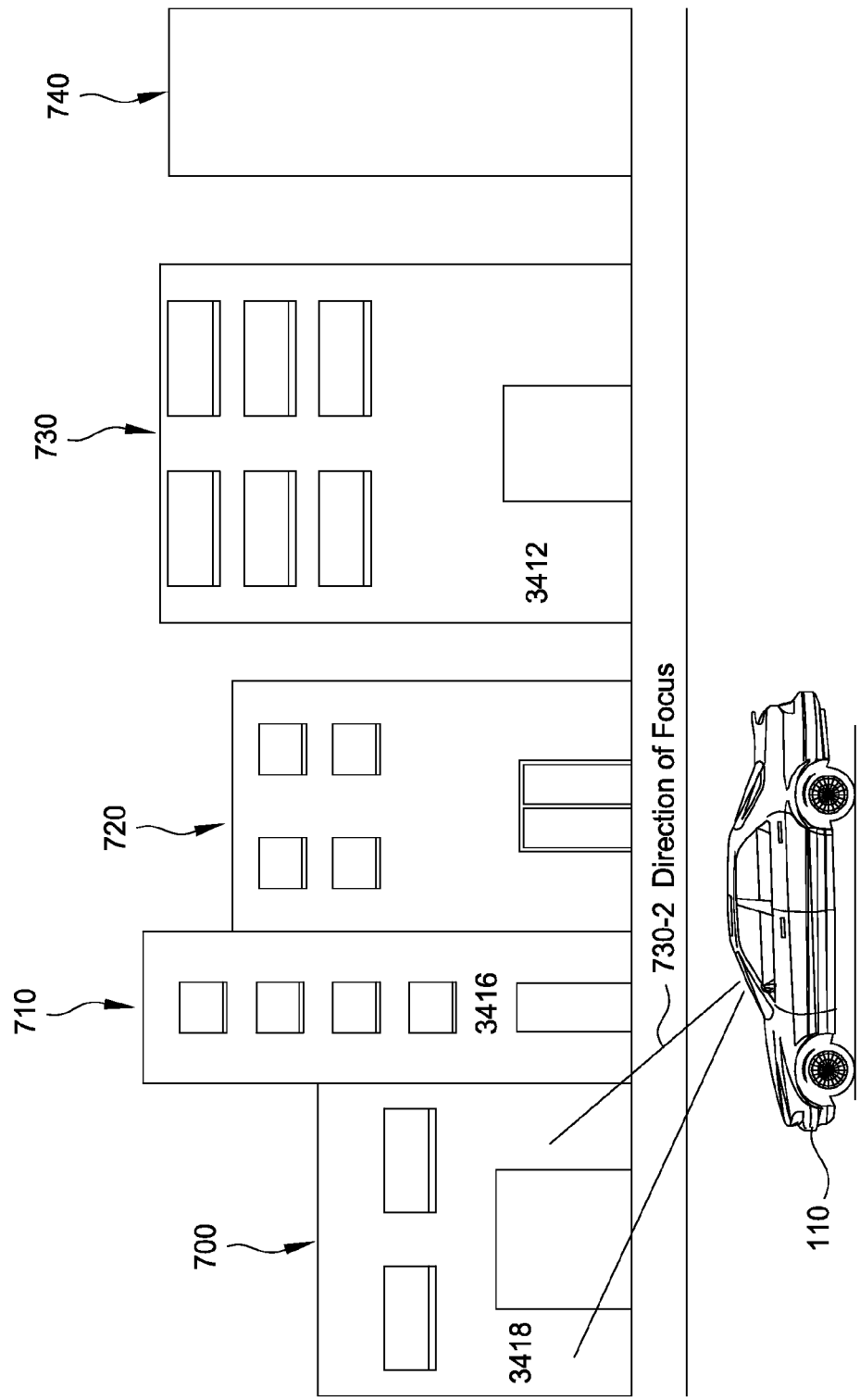

As shown in FIG. 7B, a direction of focus 730-1 of driver 100 is aligned with building 720, which is not the final destination. Navigation system 120 is configured to determine that driver 100 is looking at the wrong building and to then generate correction information that informs driver 100 of the correct building, relative to direction of focus 730-1 and building 730. In particular, navigation system 120 indicates to driver 100 that the final destination is two buildings past the building at which driver 100 is currently looking. Driver 100 may then shift focus to direction of focus 730-2 and view the final destination, as shown in FIG. 7C.

Referring generally to FIGS. 3A-7C, persons skilled in the art will understand that the exemplary use-case scenarios described in conjunction with those figures is not meant to be exhaustive and only intended to illustrate possible situations within which navigation system 120 may provide navigation assistance. In addition, those skilled in the art will recognize that the different techniques described thus far may be broadly categorized into two separate embodiments, as also mentioned above in conjunction with FIG. 1.

Again, in the first embodiment, navigation system 120 may provide a context-specific driving instruction relative to a real-world object, and then provide correction information relative to an object of focus at which driver 100 is looking, as described in stepwise fashion below in conjunction with FIG. 8. In the second embodiment, navigation system 120 may provide a context-specific driving instruction relative to an object of focus at which driver 100 is already looking, as described in stepwise fashion below in conjunction with FIG. 9.

Figure 8:
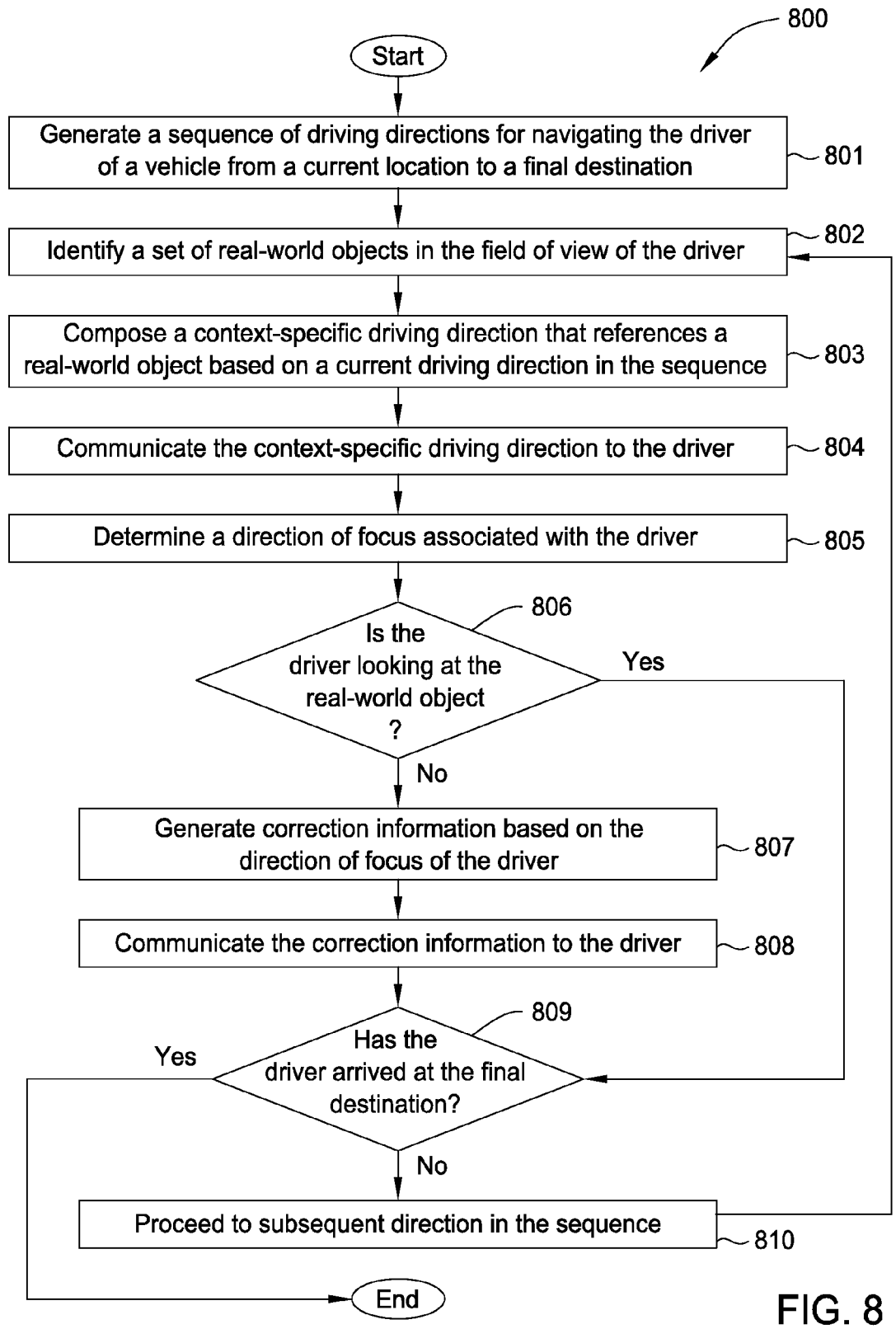
FIG. 8 is a flow diagram of method steps for generating a context-specific driving instruction that references a real-world object, according to various embodiments of the present invention.

FIG. 8 is a flow diagram of method steps for generating a context-specific driving instruction that references a real-world object for the driver of a vehicle, according to various embodiments of the present invention. Although the method steps are described in conjunction with the system of FIG. 1, persons skilled in the art will understand that any system configured to perform the method steps, in any order, is within the scope of the present invention.

As shown, a method 800 begins at step 801, where navigation system 120 generates a sequence of driving instructions for directing driver 100 of vehicle 110 from a current location to a final destination. Navigation system 120 may query driver 100 for an address associated with the final destination, and rely on position services such as GPS to determine the current instructions of vehicle 110. In addition, navigation system 120 may acquire the sequence of driving directions from an external source, such as, e.g., a cloud-based navigation service.

At step 802, navigation system 120 identifies a set of real-world objects in field of view 150 of driver 100. Navigation system 120 may receive video data captured by outward-facing cameras 122 and then process that video data to identify the set of real-world objects. Navigation system 120 could, for example, and without limitation, rely on computer vision techniques, along with a database of identifiable objects, to associate different regions of each frame of video data with a particular category of object. In embodiments where outward facing cameras 122 include other types of sensors, as described above in conjunction with FIG. 1, navigation system 120 is configured to process other types of data. For example, when outward facing cameras 122 includes a LIDAR-based sensor, navigation system 120 could receive and process laser data (using, e.g., computer vision or equivalent techniques) to identify the set of real-world objects. At step 803, navigation system 120 generates a context-specific driving instruction that references a real-world object in field of view 150 of driver 100 based on the current driving instruction in the sequence. In other words, navigation system 120 modifies the current driving instruction to specifically reference a contextually relevant real-world object that driver 100 may perceive.

At step 804, navigation system 120 causes speakers 123 to dictate the context-specific driving instruction to driver 100. At step 805, navigation system 120 determines a direction of focus associated with driver 100. Navigation system 120 is configured to track the position of each eye associated with driver 100 via eye-gaze sensors 121 and to determine the direction driver 100 is looking and a depth along that direction upon which driver 100 is focused.

At step 806, navigation system 120 determines whether driver 100 is looking at the real-world object referenced in the context-specific driving instruction. If driver 100 is, in fact, looking at the real-world object, then driver 100 may have interpreted the context-specific driving instruction correctly. However, if driver 100 is not looking at the real-world object, then driver 100 may not have understood the context-specific driving instruction. In the context of this disclosure, driver 100 is considered to be "looking at" a real-world object when, for example, driver 100 makes eye contact with the real-world object for a certain amount of time and/or repeatedly makes eye contact with the same area/object for a certain amount of time. Persons skilled in the art will understand that many techniques are possible for identifying a real-world object that driver 100 is looking at, and any such technique may be applied when navigation system 120 performs step 806.

If navigation system 120 determines, at step 806, that driver 100 is, in fact, looking at the real-world object referenced by navigation system 120, then navigation system 120 proceeds to step 809. Step 809 is described in greater detail below. However, at step 806, if navigation system 120 determines that driver 100 is not looking at the real-world object, then navigation system 120 proceeds to step 807. At step 807, navigation system 120 generates correction information based on the direction of focus of driver 100. At step 808, navigation system 120 causes speakers 123 to dictate the correction information to driver 100. The correction information generally distinguishes the real-world object associated with the context-specific driving instruction from any other object at which driver 100 may be looking.

At step 809, navigation system 120 determines if driver 100 has arrived at the final destination. If driver 100 has arrived, then the method 800 ends. Otherwise, if navigation system 120 determines that driver 100 has not yet arrived, then, at step 810, navigation system 120 proceeds to a subsequent driving instruction in the sequence of driving instructions and then returns to step 802. Accordingly, navigation system 120 is configured to repeat some or all of the method 800 until the final destination is reached. At any given time when implementing the method 800, navigation system 120 may also interact with driver 100 to provide confirmation messages indicating whether driver 100 has interpreted a context-specific instruction correctly, in the fashion described above in conjunction with FIGS. 6A-6C.

Navigation system 120 may also be configured to generate context-specific driving instructions that specifically reference a real-world object at which driver 100 is already looking, as described in greater detail below in conjunction with FIG. 9.

Figure 9:
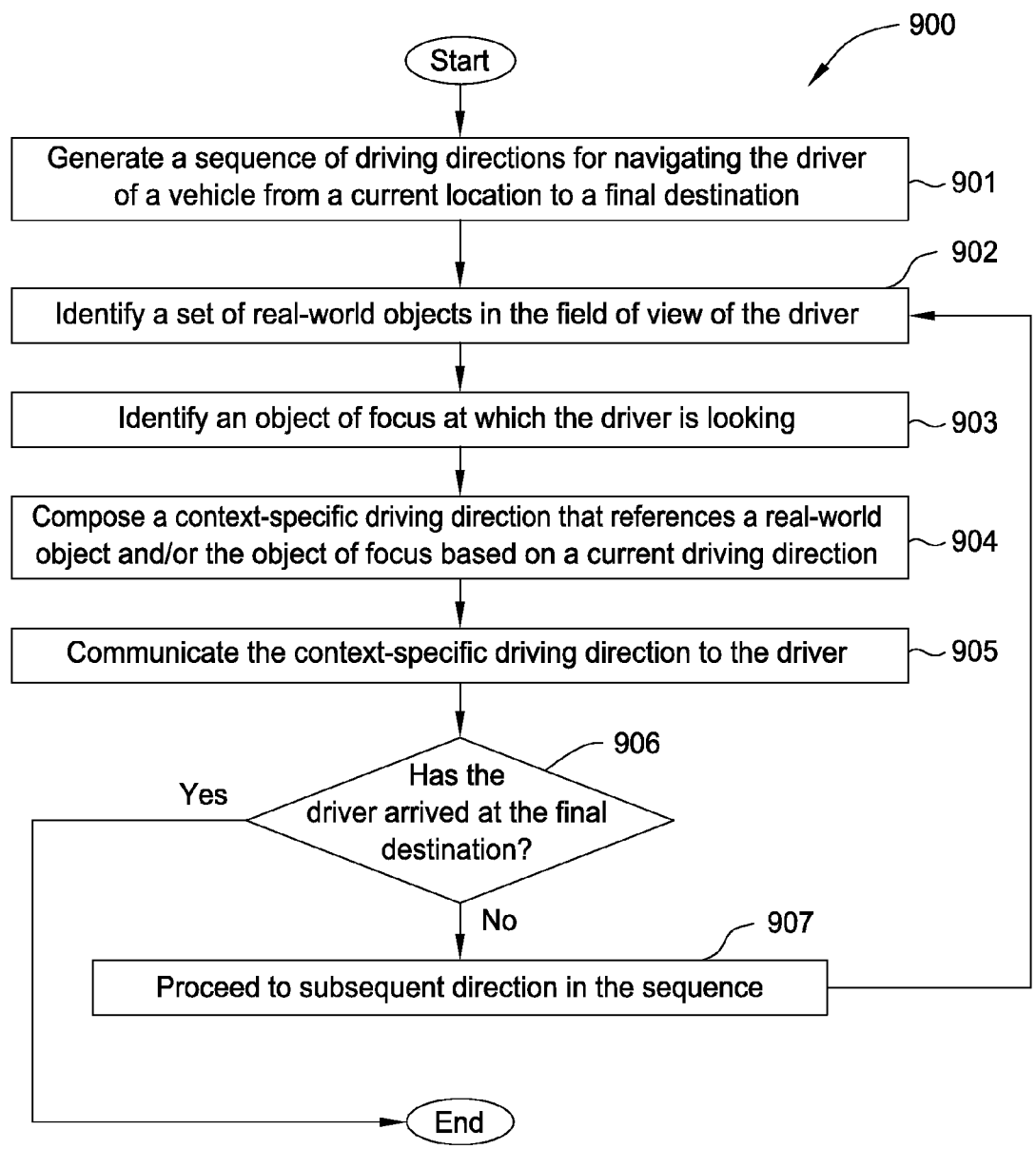
FIG. 9 is a flow diagram of method steps for generating a context-specific driving instruction that references a real-world object on which the driver of a vehicle is focused, according to various embodiments of the present invention.

FIG. 9 is a flow diagram of method steps for generating a context-specific driving instruction that references a real-world object on which the driver of a vehicle is focused, according to various embodiments of the present invention. Although the method steps are described in conjunction with the system of FIG. 1, persons skilled in the art will understand that any system configured to perform the method steps, in any order, is within the scope of the present invention.

As shown, a method 900 beings at step 901, where navigation system 120 generates a sequence of driving instructions for directing driver 100 of vehicle 110 from a current location to a final destination. Step 901 is generally similar to step 801 of the method 800. At step 902, navigation system 120 identifies a set of real-world objects in field of view 150 of driver 100, similar to step 802 of the method 800.

At step 903, navigation system 120 identifies an object of focus at which driver 100 is currently looking. Similar to step 805 of the method 800, navigation system 120 relies on eye-gaze sensors 121 to determine a direction and depth associated with the gaze of driver 100. At step 904, navigation system 120 generates a context-specific driving instruction that references the object of focus determined at step 904 based on the current driving instruction. In other words, navigation system 120 modifies the current driving instruction to specifically reference a contextually relevant real-world object. At step 905, navigation system 120 causes speakers 123 to dictate the context-specific driving instruction to driver 100.

At step 906, navigation system 120 determines if driver 100 has arrived at the final destination. If driver 100 has arrived, then the method 900 ends. Otherwise, if navigation system 120 determines that driver 100 has not yet arrived, then, at step 907, navigation system 120 proceeds to a subsequent instruction in the sequence of driving instructions and then returns to step 902. Accordingly, navigation system 120 is configured to repeat some or all of the method 900 until the final destination is reached. Similar to the method 800, at any given time when implementing the method 900, navigation system 120 may also interact with driver 100 to provide confirmation messages indicating whether driver 100 has interpreted a context-specific instruction correctly, in the fashion described above in conjunction with FIGS. 6A-6C.

Persons skilled in the art will understand that the methods 800 and 900 represent different embodiments of navigation system 120 that may be implemented in conjunction with one another. For example, and without limitation, navigation system 100 could implement the method 800 during one step in the sequence of driving instructions, and then implement the method 900 during another step in the sequence of driving instructions. Further, navigation system 120 may select between the two methods 800 and 900 based on a wide variety of criteria, including, but not limited to, the degree to which driver 100 has successfully followed previous context-specific driving instructions.

Figure 10:
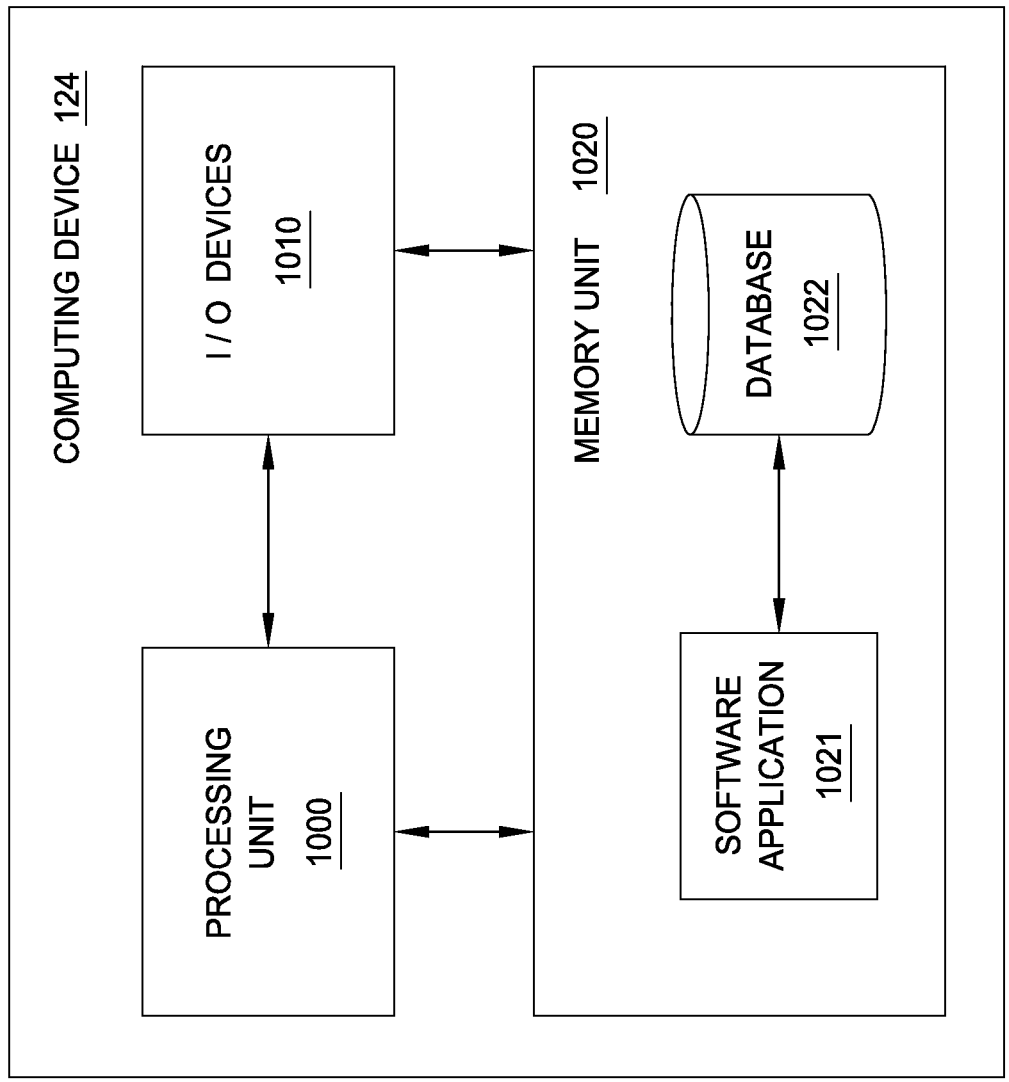
FIG. 10 is block diagram of a computing device included within the navigation system of FIG. 1, according to various embodiments of the present invention.

FIG. 10 is a block diagram of a computing device included within navigation system 120 of FIG. 1, according to various embodiments of the present invention. As shown, computing device 124 includes a processing unit 1000, input/output devices 1010, and a memory unit 1020, each of which is coupled to the others. Memory unit 1020 includes a software application 1021 coupled to a database 1022.

Processing unit 1000 may be a central processing unit (CPU), an application-specific integrated circuit (ASIC), a field-programmable gate array (FPGA), or any other type of hardware unit configured to process data and execute applications. I/O devices 1010 may includes devices capable of receiving input, including a touchscreen, keyboard, microphone, and so forth, as well a devices capable of providing output, such as speakers, display devices, and so forth. I/O devices 1010 may also include devices capable of both receiving input and providing output, such as a universal serial bus (USB) port, Ethernet port, WiFi transceiver, etc. I/O devices 1010 generally provide computing device 124 with GPS, cellular, and/or Internet connectivity.

Memory unit 1020 may be hard disk, flash memory unit, random access memory (RAM) module, or any other type of storage medium. Software application 1021 may be executed by processing unit 1000 to implement any functionality of navigation system 120 described thus far. Software application 1021 may store data to and retrieve data from database 1022. Database 1022 may include, among other things, various collections of navigation data, such as maps, driving instructions, and so forth, as well as data related to driver 100, including saved routes, configuration preferences, etc.

Persons skilled in the art will understand that portions of computing device 124 may be implemented remotely in a cloud-based environment, and that generally, computing device 124 could be any type of distributed system. For example, and without limitation, database 1022 may reside in a remote location, and software application 1021 may be configured to access that location to retrieve route information, etc. Additionally, software application 1021 itself may be downloaded from a remote location and/or updated periodically from a remote server machine. Persons skilled in the art will understand that computing device 124 represents just one exemplary computing device configured to implement the functionality of navigation system 120, and that other devices may also perform that functionality.

In sum, a navigation system is configured to generate a sequence of driving instructions for directing a driver of a vehicle from a current location to a final destination. The navigation system is configured to capture sensor data that reflects the field of view of the driver and to identify objects in that field of view. The navigation system then customizes the driving instructions to reference specific objects, thereby generating context-specific driving instructions. The navigation system is also configured to identify particular objects upon which the driver is focused, and to generate context-specific driving instructions relative to such objects of focus. The navigation system may also provide correction information to the driver upon determining that the driver has incorrectly focused on a different object than an object referenced in a context-specific driving instruction.

One advantage of the disclosed technique is that it enables context-specific driving instructions that are consistent with the visual context of the driver. Consequently, the driver may intuitively follow those instructions without distraction. Since the navigation system accounts for the field of view of the driver and specific objects upon which the driver is already focused, the navigation system can provide directions that are immediately relevant to the driver. Thus, the driver need not shift contexts in order to perform driving actions. Another advantage of the disclosed techniques is that context-specific driving instructions may closely match driving instructions that a human navigator would provide, and so the driver may naturally follow those instructions with relative ease. Since the context-specific driving instructions may be more easily interpreted and understood compared to conventional driving instructions, the driver may be far less likely to become confused and/or lost. The personal safety of the driver may thus be protected.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A system configured to generate context-specific driving instructions for a driver of a vehicle, the system comprising:
   at least one sensor configured to capture sensor data that reflects a field of view of the driver;
   an eye-gaze sensor configured to determine an eye-gaze direction of the driver;
   a computing device configured to:
      process the sensor data to identify, based on the eye-gaze direction of the driver, a first object within the field of view of the driver, and
      based on identifying the first object, generate a context-specific driving instruction that references the first object; and
   at least one output device configured to output the context-specific driving instruction to the driver.

2. The system of claim 1, wherein the eye-gaze sensor is further configured to determine a depth at which the driver is focusing, and the computing device is further configured to identify the first object by determining, based on the depth at which the driver is focusing, that the driver is focused on the first object.

3. The system of claim 1, wherein the computing device is further configured to:
   determine that the driver is focused on a second object within the field of view of the driver instead of the first object based on information received from the eye-gaze sensor;
   generate correction information that distinguishes the first object from the second object and indicates that the driver should be focused upon the first object; and
   cause the at least one output device to output the correction information to the driver.

4. The system of claim 1 wherein the computing device is further configured to:
   receive a query from the driver that references a second object within the field of view of the driver;
   generate an error message indicating that the driver is incorrectly focused upon the second object; and
   cause the at least one output device to output the error message to the driver.

5. The system of claim 1, wherein the computing device is further configured to:
   receive input from the driver specifying a final destination;
   determine a current location of the vehicle;
   generate a sequence of driving instructions to direct the driver from the current location to the final destination, wherein each driving instruction in the sequence of driving instructions indicates a particular driving action to be performed by the driver;
   identify a current driving instruction in the sequence of driving instructions that is associated with the current location of the vehicle; and
   generate the context-specific driving instruction by modifying the current driving instruction to include a reference to the first object.

6. The system of claim 1, wherein the computing device is configured to identify the first object by determining, based on the eye-gaze direction of the driver, that the driver is looking towards the first object.

7. The system of claim 2 wherein the computing device is further configured to:
   receive a query from the driver that references the first object;
   generate a confirmation message indicating that the driver is correctly focused upon the first object; and
   cause the at least one output device to output the confirmation message to the driver.

8. The system of claim 3, wherein the computing device is further configured to:
   receive a notification from the eye-gaze sensor indicating that the driver has shifted focus from the second object to the first object;
   generate a confirmation message confirming that the driver is properly focused upon the first object instead of the second object; and
   cause the at least one output device to output the confirmation message to the driver.
   cause the at least one output device to output the error message to the driver.

9. A non-transitory computer-readable medium that, when executed by a processing unit, causes the processing unit to generate context-specific driving instructions for a driver of a vehicle, by performing the steps of:
   capturing data from a visual panorama that surrounds at least a portion of the vehicle;
   receiving an eye-gaze direction of the driver from an eye-gaze sensor;

identifying a first object within the visual panorama based on the eye-gaze direction;

based on identifying the first object, generating a context-specific driving instruction that references the first object; and outputting the context-specific driving instruction to the driver.

10. The non-transitory computer-readable medium of claim 9, further comprising the step of receiving a depth at which the driver is focusing from the eye-gaze sensor, and wherein identifying the first object further comprises determining, based on the depth at which the driver is focusing, that the driver is focused on the first object.

11. The non-transitory computer-readable medium of claim 9, further comprising the steps of:
determining that the driver is focused on a second object within the visual panorama instead of the first object based on the information received from the eye-gaze sensor;
generating correction information indicating that the driver should be focused upon the first object and should not be focused on the second object; and
outputting the correction information to the driver.

12. The non-transitory computer-readable medium of claim 9, further comprising the step of:
determining a final destination for the vehicle;
determining a current location of the vehicle;
acquiring a sequence of driving instructions to direct the driver from the current location to the final destination, wherein each driving instruction in the sequence of driving instructions indicates a particular driving action to be performed by the driver;
identifying a current driving instruction in the sequence of driving instructions that indicates a subsequent driving action to be performed by the driver; and
generating the context-specific driving instruction by modifying the current driving instruction to include a reference to the first object.

13. The non-transitory computer-readable medium of claim 10, further comprising the steps of:
receiving a query from the driver regarding a second object within the field of view of the driver;
generating an error message indicating that the driver should ignore the second object; and
outputting the error message to the driver.

14. The non-transitory computer-readable medium of claim 10, further comprising the steps of:
receiving a query from the driver regarding the first object;
generating a confirmation message indicating that the driver should continue to focus upon the first object; and
outputting the confirmation message to the driver.

15. The non-transitory computer-readable medium of claim 11, further comprising the steps of:
receiving a notification from the eye-gaze sensor indicating that the driver has shifted focus from the second object to the first object;
generating a confirmation message based on the notification; and
outputting the confirmation message to the driver.

16. A computer-implemented method for generating context-specific driving instructions for a driver of a vehicle, the method comprising:
capturing data that reflects a field of view of the driver;
receiving, via an eye-gaze sensor, an eye-gaze direction of the driver;
processing the data to identify, based on the eye-gaze direction of the driver, a first object within the field of view of the driver;
based on identifying the first object, generating a context-specific driving instruction that references the first object; and
outputting the context-specific driving instruction to the driver.

17. The computer-implemented method of claim 16, further comprising:
determining that the driver is focused on a second object within the field of view of the driver instead of the first object based on information received from the eye-gaze sensor;
generating correction information that distinguishes the first object from the second object and indicates that the driver should be focused upon the first object; and
outputting the correction information to the driver.

18. The computer-implemented method of claim 16, further comprising receiving a depth at which the driver is focusing from the eye-gaze sensor, and wherein identifying the first object further comprises determining, based on the depth at which the driver is focusing, that the driver is focused upon the first object.

19. The computer-implemented method of claim 16, further comprising:
determining a current location of the vehicle;
acquiring a sequence of driving instructions to direct the driver from the current location to the final destination, wherein each driving instruction in the sequence of driving instructions indicates a particular driving action to be performed by the driver;
identifying a current driving instruction in the sequence of driving instructions that indicates a subsequent driving action to be performed by the driver; and
generating the context-specific driving instruction by modifying the current driving instruction to include a reference to the first object.

20. A system configured to generate context-specific driving instructions for a driver of a vehicle, the system comprising:
at least one sensor configured to capture sensor data that reflects a field of view of the driver;
an eye-gaze sensor configured to identify one or more objects within the field of view of the driver upon which the driver is focused;
a computing device configured to:
process the sensor data to identify a first object within the field of view of the driver;
generate a context-specific driving instruction that references the first object;
determine that the driver is focused on a second object within the field of view of the driver instead of the first object based on information received from the eye-gaze sensor; and
generate correction information that distinguishes the first object from the second object and indicates that the driver should be focused upon the first object; and
at least one output device configured to:
output the context-specific driving instruction to the driver; and
output the correction information to the driver.

21. The system of claim 20, wherein the computing device is further configured to:
receive a notification from the eye-gaze sensor indicating that the driver has shifted focus from the second object to the first object;

generate a confirmation message confirming that the driver is properly focused upon the first object instead of the second object; and cause the at least one output device to output the confirmation message to the driver.

22. A non-transitory computer-readable medium that, when executed by a processing unit, causes the processing unit to generate context-specific driving instructions for a driver of a vehicle, by performing the steps of:

capturing data from a visual panorama that surrounds at least a portion of the vehicle;

identifying a first object within the visual panorama;

generating a context-specific driving instruction that references the first object;

outputting the context-specific driving instruction to the driver;

receiving information from an eye-gaze sensor that indicates one or more objects within the visual panorama upon which the driver is focused;

determining that the driver is focused on a second object within the visual panorama instead of the first object based on the information received from the eye-gaze sensor;

generating correction information indicating that the driver should be focused upon the first object and should not be focused on the second object; and outputting the correction information to the driver.

23. The non-transitory computer-readable medium of claim 22, further comprising the steps of:

receiving a notification from the eye-gaze sensor indicating that the driver has shifted focus from the second object to the first object;

generating a confirmation message based on the notification; and outputting the confirmation message to the driver.

* * * * *